(12) United States Patent
Gunnam et al.

(10) Patent No.: US 8,768,990 B2
(45) Date of Patent: Jul. 1, 2014

(54) RECONFIGURABLE CYCLIC SHIFTER ARRANGEMENT

(75) Inventors: Kiran Gunnam, San Jose, CA (US); Madhusudan Kalluri, Sunnyvale, CA (US)

(73) Assignee: LSI Corporation, San Jose, CA (US)

( * ) Notice: Subject to any disclaimer, the term of this patent is extended or adjusted under 35 U.S.C. 154(b) by 356 days.

(21) Appl. No.: 13/294,332

(22) Filed: Nov. 11, 2011

(65) Prior Publication Data

US 2013/0124590 A1    May 16, 2013

(51) Int. Cl.
  *G06F 5/01*    (2006.01)
(52) U.S. Cl.
  USPC ......................................................... 708/209
(58) Field of Classification Search
  None
  See application file for complete search history.

(56) References Cited

U.S. PATENT DOCUMENTS

| 3,755,779 | A  | 8/1973 | Price |
| 4,295,218 | A  | 10/1981 | Tanner |
| 5,048,060 | A  | 9/1991 | Arai et al. |
| 5,721,745 | A  | 2/1998 | Hladik et al. |
| 5,734,962 | A  | 3/1998 | Hladik et al. |
| 6,023,783 | A  | 2/2000 | Divsalar et al. |
| 6,236,686 | B1 | 5/2001 | Kamishima |
| 6,307,901 | B1 | 10/2001 | Yu et al. |
| 6,550,023 | B1 | 4/2003 | Brauch et al. |
| 6,678,843 | B2 | 1/2004 | Giulietti et al. |
| 6,745,157 | B1 | 6/2004 | Weiss et al. |
| 6,760,879 | B2 | 7/2004 | Giese et al. |
| 6,888,897 | B1 | 5/2005 | Nazari et al. |
| 6,910,000 | B1 | 6/2005 | Yedidia et al. |
| 7,143,333 | B2 | 11/2006 | Blankenship et al. |
| 7,181,676 | B2 | 2/2007 | Hocevar |
| 7,219,288 | B2 | 5/2007 | Dielissen et al. |
| 7,237,181 | B2 | 6/2007 | Richardson |
| 7,296,216 | B2 | 11/2007 | Shen et al. |

(Continued)

FOREIGN PATENT DOCUMENTS

| CN | 101174838 A | 5/2008 |
| CN | 101174839 A | 5/2008 |

(Continued)

OTHER PUBLICATIONS

Matsuoka, K., et al., "Improvement of Turbo Equalization with LDPC Code," IEICE Transaction, Apr. 1, 2007, vol. J90-B, No. 4, pp. 432-436 with partial English translation.

(Continued)

*Primary Examiner* — David H Malzahn
(74) *Attorney, Agent, or Firm* — Mendelsohn, Drucker & Dunleavy, P.C.; Craig M. Brown; Steve Mendelsohn

(57) ABSTRACT

In one embodiment, a reconfigurable cyclic shifter arrangement has first and second reconfigurable cyclic shifters connected in series that are each selectively and independently configurable to operate in any one of three different modes at a time. In a first mode, the reconfigurable cyclic shifter is configured as four 4×4 cyclic shifters to cyclically shift four sets of four input values. In a second mode, the reconfigurable cyclic shifter is configured as two 8×8 cyclic shifters to cyclically shift two sets of eight input values. In a third mode, the reconfigurable cyclic shifter is configured as one 16×16 cyclic shifter to cyclically shift one set of 16 input values. Because the first and second reconfigurable cyclic shifters are independently configurable, there are nine different configurations of the reconfigurable cyclic shifter arrangement.

20 Claims, 11 Drawing Sheets

(56) References Cited

U.S. PATENT DOCUMENTS

| | | |
|---|---|---|
| 7,340,671 B2 | 3/2008 | Jones et al. |
| 7,353,444 B2 | 4/2008 | Owsley et al. |
| 7,373,581 B2 | 5/2008 | Okamura et al. |
| 7,457,367 B2 | 11/2008 | Farhang-Boroujeny et al. |
| 7,689,888 B2 | 3/2010 | Kan et al. |
| 7,725,800 B2 | 5/2010 | Yang et al. |
| 7,730,377 B2 | 6/2010 | Hocevar |
| 7,739,558 B1 | 6/2010 | Farjadrad et al. |
| 7,752,523 B1 | 7/2010 | Chaichanavong et al. |
| 7,770,090 B1 | 8/2010 | Kons et al. |
| 7,805,642 B1 | 9/2010 | Farjadrad |
| 7,895,500 B2 | 2/2011 | Sun et al. |
| 7,904,793 B2 | 3/2011 | Mokhlesi et al. |
| 7,941,737 B2 | 5/2011 | Gopalakrishnan et al. |
| 7,949,927 B2 | 5/2011 | Park et al. |
| 8,010,869 B2 | 8/2011 | Wejn et al. |
| 8,020,070 B2 | 9/2011 | Langner et al. |
| 8,037,394 B2 | 10/2011 | Djurdjevic et al. |
| 8,046,658 B2 | 10/2011 | Heinrich et al. |
| 8,051,363 B1 | 11/2011 | Liu |
| 8,103,931 B2 | 1/2012 | Wang et al. |
| 8,127,209 B1 | 2/2012 | Zhang et al. |
| 8,151,171 B2 | 4/2012 | Blanksby |
| 8,156,409 B2 | 4/2012 | Patapoutian et al. |
| 8,161,345 B2 | 4/2012 | Graef |
| 8,171,367 B2 | 5/2012 | Gao et al. |
| 8,205,134 B2 | 6/2012 | Harrison et al. |
| 8,205,144 B1 | 6/2012 | Yadav |
| 8,214,719 B1 | 7/2012 | Sheng et al. |
| 8,219,878 B1 | 7/2012 | Varnica et al. |
| 8,255,763 B1 | 8/2012 | Yang et al. |
| 8,301,984 B1 | 10/2012 | Zhang et al. |
| 8,307,253 B2 * | 11/2012 | Gunnam ............... 714/752 |
| 8,312,342 B2 * | 11/2012 | Gunnam ............... 714/752 |
| 8,327,235 B2 * | 12/2012 | Gunnam ............... 714/780 |
| 8,407,567 B2 * | 3/2013 | Gunnam ............... 714/780 |
| 8,468,429 B2 * | 6/2013 | Gunnam ............... 714/780 |
| 2002/0062468 A1 | 5/2002 | Nagase et al. |
| 2002/0166095 A1 | 11/2002 | Lavi et al. |
| 2005/0132260 A1 | 6/2005 | Kyung et al. |
| 2005/0193320 A1 | 9/2005 | Varnica et al. |
| 2005/0204255 A1 | 9/2005 | Yeh et al. |
| 2005/0204264 A1 | 9/2005 | Yusa |
| 2005/0283707 A1 | 12/2005 | Sharon et al. |
| 2006/0013306 A1 | 1/2006 | Kim et al. |
| 2006/0036928 A1 | 2/2006 | Eroz et al. |
| 2006/0107181 A1 | 5/2006 | Dave et al. |
| 2006/0115802 A1 | 6/2006 | Reynolds |
| 2006/0285852 A1 | 12/2006 | Xi et al. |
| 2007/0011569 A1 | 1/2007 | Vila Casado et al. |
| 2007/0011573 A1 | 1/2007 | Farjadrad et al. |
| 2007/0011586 A1 | 1/2007 | Belogolovyi et al. |
| 2007/0044006 A1 | 2/2007 | Yang et al. |
| 2007/0071009 A1 | 3/2007 | Nagaraj et al. |
| 2007/0089018 A1 | 4/2007 | Tang et al. |
| 2007/0089019 A1 | 4/2007 | Tang et al. |
| 2007/0124652 A1 | 5/2007 | Litsyn et al. |
| 2007/0147481 A1 | 6/2007 | Bottomley et al. |
| 2007/0153943 A1 | 7/2007 | Nissila |
| 2007/0162788 A1 | 7/2007 | Moelker |
| 2007/0220408 A1 | 9/2007 | Huggett et al. |
| 2007/0234178 A1 | 10/2007 | Richardson et al. |
| 2007/0234184 A1 | 10/2007 | Richardson |
| 2008/0049869 A1 | 2/2008 | Heinrich et al. |
| 2008/0082868 A1 | 4/2008 | Tran et al. |
| 2008/0104485 A1 | 5/2008 | Lyakh et al. |
| 2008/0109701 A1 | 5/2008 | Yu et al. |
| 2008/0126910 A1 | 5/2008 | Venkatesan et al. |
| 2008/0148129 A1 | 6/2008 | Moon et al. |
| 2008/0163032 A1 | 7/2008 | Lastras-Montano |
| 2008/0235561 A1 | 9/2008 | Yang |
| 2008/0276156 A1 | 11/2008 | Gunnam et al. |
| 2008/0301517 A1 | 12/2008 | Zhong |
| 2008/0301521 A1 | 12/2008 | Gunnam et al. |
| 2009/0063931 A1 | 3/2009 | Rovini et al. |
| 2009/0083609 A1 | 3/2009 | Yue et al. |
| 2009/0132897 A1 | 5/2009 | Xu et al. |
| 2009/0150745 A1 | 6/2009 | Langner et al. |
| 2009/0235146 A1 | 9/2009 | Tan et al. |
| 2009/0259912 A1 | 10/2009 | Djordjevic et al. |
| 2009/0273492 A1 | 11/2009 | Yang et al. |
| 2009/0307566 A1 | 12/2009 | No et al. |
| 2009/0319860 A1 | 12/2009 | Sharon et al. |
| 2010/0037121 A1 | 2/2010 | Jin et al. |
| 2010/0042806 A1 | 2/2010 | Gunnam |
| 2010/0042890 A1 | 2/2010 | Gunnam |
| 2010/0042891 A1 | 2/2010 | Gunnam et al. |
| 2010/0042892 A1 * | 2/2010 | Gunnam ............... 714/752 |
| 2010/0042893 A1 * | 2/2010 | Gunnam ............... 714/752 |
| 2010/0042894 A1 | 2/2010 | Gunnam |
| 2010/0042896 A1 | 2/2010 | Gunnam |
| 2010/0042897 A1 | 2/2010 | Han et al. |
| 2010/0042898 A1 * | 2/2010 | Gunnam ............... 714/755 |
| 2010/0042902 A1 * | 2/2010 | Gunnam ............... 714/780 |
| 2010/0042903 A1 * | 2/2010 | Gunnam ............... 714/780 |
| 2010/0042904 A1 | 2/2010 | Gunnam |
| 2010/0042905 A1 | 2/2010 | Gunnam et al. |
| 2010/0042906 A1 | 2/2010 | Gunnam et al. |
| 2010/0050043 A1 | 2/2010 | Savin |
| 2010/0058152 A1 | 3/2010 | Harada |
| 2010/0088575 A1 | 4/2010 | Sharon et al. |
| 2010/0192043 A1 | 7/2010 | Alrod et al. |
| 2010/0241921 A1 | 9/2010 | Gunnam |
| 2011/0041029 A1 | 2/2011 | Yedidia et al. |
| 2011/0126075 A1 | 5/2011 | Gunnam |
| 2011/0138253 A1 | 6/2011 | Gunnam |
| 2011/0264979 A1 | 10/2011 | Gunnam et al. |
| 2011/0311002 A1 | 12/2011 | Li et al. |
| 2011/0320902 A1 | 12/2011 | Gunnam |
| 2012/0005551 A1 | 1/2012 | Gunnam |
| 2012/0005552 A1 | 1/2012 | Gunnam |
| 2012/0135285 A1 | 5/2012 | Iwama et al. |
| 2012/0139074 A1 | 6/2012 | Abe |
| 2013/0124590 A1 * | 5/2013 | Gunnam et al. ............ 708/209 |

FOREIGN PATENT DOCUMENTS

| | | |
|---|---|---|
| EP | 1926142 A1 | 5/2008 |
| JP | 2001251384 A | 9/2001 |
| JP | 2004005854 A | 1/2004 |
| JP | 2005020505 A | 1/2005 |
| JP | 2005500513 A | 1/2005 |
| JP | 2007306495 A | 11/2007 |
| JP | 2008112516 A | 5/2008 |
| JP | 2009100222 A | 5/2009 |
| TW | 200814544 A | 3/2008 |
| WO | WO03092170 A1 | 11/2003 |
| WO | WO2004079563 A1 | 9/2004 |
| WO | WO2007114724 A1 | 10/2007 |
| WO | WO2008004215 A2 | 1/2008 |
| WO | WO 2010019168 A1 | 2/2010 |
| WO | WO 2010123493 A1 | 10/2010 |

OTHER PUBLICATIONS

Lee, M.K., et al., "Adaptive Turbo Equalizer with Stopping Rule Based on LDPC Codes," ISIT, 2009, pp. 928-932.

Pusane, A.E.; Costello, D.J.; Mitchell, D.G.M;, "Trapping Set Analysis of Protograph-Based LDPC Convolutional Codes," Information Theory, 2009. ISIT 2009. IEEE International Symposium on, vol., No., pp. 561-565, Jun. 28, 2009-Jul. 3, 2009.

Laendner, S.; Milenkovic, O.;, "LDPC Codes Based on Latin Squares: Cycle Structure, Stopping Set, and Trapping Set Analysis," Communications, IEEE Transactions on, vol. 55, No. 2, pp. 303-312, Feb. 2007.

Dehkordi, M.K,; Banihashemi, A.H.;, "An Efficient Algorithm for Finding Dominant Trapping Sets of LDPC Codes," Turbo Codes and Iterative Information Processing (ISTC), 2010 6th International Symposium on, pp. 444-448, Sep. 6-10, 2010.

C. A. Cole, S. G. Wilson, E. K. Hall and T. R. Giallorenzi, "A General Method for Finding Low Error Rates of LDPC Codes," http://arxiv.org/abs/cs.IT/0605051.

(56) References Cited

OTHER PUBLICATIONS

D. MacKay and M. Postol, "Weaknesses of margulis and ramanujan-margulis low-density parity-check codes," Electronic Notes in Theoretical Computer Science, vol. 74, 2003.

B. Xia and W. E. Ryan, "On importance sampling for linear block codes," Proc. 2003 IEEE International Conference on Communications, vol. 4, pp. 2904-2908, May 2003.

L. Dolecek, Z. Zhang, M. Wainwright, V. Anantharam, and B. Nikoli'c, "Evaluation of the low frame error rate performance of LDPC codes using importance sampling," 2007 IEEE Inform. Theory Workshop, Sep. 2-6, 2007.

Kang, J., et al., "A Two-Stage Iterative Decoding of LDPC Codes for Lowering Error Floors," IEEE Global Telecommunications Conference, 2008, pp. 1-4.

Sharon, E, et al., "An Efficient Message-Passing Schedule for LDPC Decoding," 2004, XP002713218, Retrieved from http://www.eng.biu.ac.il/goldbej/papers/engisreal.pdf on Sep. 19, 2013, 4 pages.

Kiran Gunnam, Gwan Choi, Mark Yeary—"An LDPC decoding schedule for memory access reduction", IEEE International Conference on Acoustics, Speech, and Signal Processing (ICASSP) 2004, pp. 173-176, vol. 15.

Stefan Landner, Olgica Milenkovic—"Algorithmic and Combinatorial Analysis of Trapping Sets in Structured LDPC Codes", International Conference on Wireless Networks, Communications and Mobile Computing, 2005, pp. 630-635, vol. 1.

Hao Zhong,Tong Zhang—"Block-LDPC: A Practical LDPC Coding System Design Approach", IEEE transactions on circuits and systems—I: Regular Papers, Apr. 2005, pp. 766-775, vol. 52.

Kiran K. Gunnam, Gwan S. Choi, Weihuang Wang, Euncheol Kim, and Mark B. Yeary—"Decoding of Quasi-cyclic LDPC Codes Using an On-the-Fly Computation", Fortieth Asilomar Conference on Signals, Systems and Computers (ACSSC), 2006, pp. 1192-1199.

Thomas J. Richardson and Rudiger L. Urbanke—"Efficient Encoding of Low-Density Parity-Check Codes", IEEE Transactions on Information Theory, Feb. 2001,pp. 638-656,vol. 47, No. 2.

Tom Richardson—"Error Floors of LDPC Codes", IEEE Transactions on Information Theory, Feb. 2001, pp. 1426-1435,vol. 47, No. 2.

E. Papagiannis, C. Tjhai, M. Ahmed, M. Ambroze, M. Tomlinson—"Improved Iterative Decoding for Perpendicular Magnetic Recording", The ISCTA 2005 Conference on Feb. 4, 2005,pp. 1-4.

Kiran K. Gunnam, Gwan S. Choi, and Mark B. Yeary—"A Parallel VLSI Architecture for Layered Decoding for Array LDPC Codes", 20th International Conference on VLSI Design, 2007,6th International Conference on Embedded Systems, Jan. 2007 pp. 738-743.

David J.C. Mackay—"Information Theory, Inference, and Learning Algorithms", Cambridge University Press Sep. 2003, p. 640.

R. Michael Tanner, Deepak Sridhara, Arvind Sridharan, Thomas E. Fuja, and Daniel J. Costello, Jr—"LDPC Block and Convolutional Codes Based on Circulant Matrices", IEEE Transactions on Information Theory, Dec. 2004, pp. 2966-2984, vol. 50, No. 12.

Amin Shokrollahi—"LDPC Codes: An Introduction, in Coding, Cryptography and Combinatorics",Computer Science and Applied Logic, Birkhauser, Basel, 2004, pp. 85-110, vol. 23.

Yang Han and William E. Ryan—"LDPC Decoder Strategies for Achieving Low Error Floors", Proceedings of Information Theory and Applications Workshop, San Diego, CA, Jan. 2008, pp. 1-10.

Mohammad M. Mansour and Naresh R. Shanbhag—"Low Power VLSI decoder architectures for LDPC codes" International Symposium on Low Power Electronics and Design Proceedings of the 2002, ICIMS Research Center, 2002, pp. 284-289.

Dale E. Hocevar—"A Reduced Complexity Decoder Architecture Via Layered Decoding of LDPC Codes", IEEE Workshop on Signal Processing Systems, 2004, pp. 107-112.

Robert G. Gallager—"Low Density Parity—Check Codes",Cambridge Mass Jul. 1963,p. 90.

T. Richardson and R. Urbanke—"Modern Coding Theory", Cambridge University Press, Preliminary version—Oct. 18, 2007, p. 590.

Kiran Gunnam, Gwan Choi, Weihuang Wang, Mark Yeary—"Multi-Rate Layered Decoder Architecture for Block LDPC Codes of the IEEE 802, 11n Wireless Standard", IEEE International Symposium on Circuits and Systems (ISCAS) 2007, pp. 1645-1648.

Kiran K. Gunnam, Gwan S. Choi, Mark B. Yeary, Shaohua Yang and Yuanxing Lee—"Next Generation Iterative LDPC Solutions for Magnetic Recording Storage", 42nd Asilomar Conference on Signals, Systems and Computers, 2008, pp. 1148-1152.

D.J.C. MacKay and R.M. Neal—"Near Shannon limit performance of low density parity check codes", Electronics Letters Mar. 13, 1997, pp. 458-459, vol. 33 No. 6.

Jinghu Chen, Ajay Dholakia, Evangelos Eleftheriou, Marc P. C. Fossorier, Xiao-Yu Hu, "Reduced-Complexity Decoding of LDPC Codes", IEEE Transactions on Communications, Aug. 2005, pp. 1288-1299,vol. 53, No. 8.

Kiran K. Gunnam, Gwan S. Choi, Mark B. Yeary and Mohammed Atiquzzaman—"VLSI Architectures for Layered Decoding for Irregular LDPC Codes of WiMax", IEEE International Conference on Communications (ICC), 2007, pp. 4542-4547.

Andrew J. Blanksby and Chris J. Howland—"A 690-mW 1-Gb/s 1024-b, Rate-1/2 Low-Density Parity-Check Code Decoder", IEEE Journal of Solid-State Circuits, Mar. 2002.pp. 404-412,vol. 37, No. 3.

Kiran Gunnam, Weihuang Wang, Gwan Choi, Mark Yeary—"VLSI Architectures for Turbo Decoding Message Passing Using Min-Sum for Rate-Compatible Array LDPC Codes", 2nd International Symposium on Wireless Pervasive Computing (ISWPC), 2007, pp. 561-566.

Kiran K. Gunnam, Gwan S. Choi, Weihuang Wang, and Mark B. Yeary—"A Parallel VLSI Architecture for Layered Decoding",Proceedings of the 20th International Conference on VLSI Design, 6th International Conference: Embedded Systems, 2007, pp. 738-743.

R.Michael Tanner—"A Recursive Approach to Low Complexity Codes",IEEE transaction on Information Theory, Sep. 1981,pp. 533-547,vol. IT-27, No. 5.

Mohammad M. Mansour, and Naresh R. Shanbhag—"A 640-Mb/s 2048-Bit Programmable LDPC Decoder Chip", IEEE Journal of Solid-State Circuits, Mar. 2006, pp. 684-698,vol. 41, No. 3.

Badri N. Vellambi R, and Faramarz Fekri, "An Improved Decoding Algorithm for Low-Density Parity-Check Codes over the Binary Erasure Channel", IEEE GLOBECOM 2005 proceedings, pp. 1182-1186.

Yang Han, William E. Ryan—"Low-Floor Decoders for LDPC Codes", IEEE Transactions on Communications, vol. 57, No. 6, Jun. 2009, pp. 1663-1673.

Vila Casado, Andres I., Weng, Wen-Yen and Wesel, Richard D. "Multiple Rate Low-Density Parity-Check Codes with Constant Blocklength," IEEE 2004, pp. 2010-2014.

Vila Casado, Andres I. "Variable-rate Low-denisty Parity-check Codes with Constant Blocklength," UCLA Technologies Available for Licensing Copyright © 2009 The Regents of the University of California. http://www.research.ucla.edu/tech/ucla05-074.htm (2 pages).

Vila Casado, Andres I., Weng, Wen-Yen, Valle, Stefano and Wesel, Richard D. "Multiple-Rate Low-Density Parity-Check Codes with Constant Blocklength," IEEE Transactions on Communications, vol. 57, No. 1, Jan. 2009; pp. 75-83.

Gunnam, Kiran K., Choi, Gwan S., and Yeary, Mark B., "Technical Note on Iterative LDPC Solutions for Turbo Equalization," Texas A&M Technical Note, Department of ECE, Texas A&M University, College Station, TX 77843, Jul. 2006 (available online at http://dropzone.tamu.edu), pp. 1-5.

Richardson, Tom, "Error Floors of LDPC Codes," Allerton Conf. on Communication, Control and Computing, (Monticello, Illinois), Oct. 2003, pp. 1426-1435.

Cole, Chad A. and Hall, Eric K., "Analysis and Design of Moderate Length Regular LDPC Codes with Low Error Floors," Proc, 40th Conf. Information Sciences and Systems, Princeton, NJ, 2006, 6 pgs.

Cavus et al., "A Performance Improvement and Error Floor Avoidance Technique for Belief Propagation Decoding of LDPC Codes," IEEE 16th International Symposium, Personal, Indoor & Mobile Radio Communications (PIMRC), Berlin, Germany Sep. 11-14, 2005, pp. 2386-2390.

(56) References Cited

OTHER PUBLICATIONS

Cavus, Enver et al., "An IS Simulation Technique for Very Low BER Performance Evaluation of LDPC Codes," IEEE International Conference on Communications, Jun. 1, 2006, pp. 1095-1100.

Sripimanwat, K., "Turbo Code Applications: A Journey From a Paper to Realization", Oct. 26, 2005, Springer, p. 27.

Tuchler, M., et al., "Improved Receivers for Digital High Frequency Waveforms Using Turbo Equalization," Military Communications Conference; Milcom 2002 Proceedings; Anaheim, CA, Oct. 7-10, 2002; IEEE Military Communications Conference, New York, NY; IEEE; US, vol. 1, Oct. 7, 2002; pp. 99-104; XP002966498.

Alghonaim, E., et al., "Improving BER Performance of LDPC codes Based on Intermediate Decoding Results," Signal Processing and Communications; 2007; ICSPC, 2007; IEEE International Conference; IEEE; Piscataway, NJ; USA; Nov. 24, 2007; pp. 1547-1550; XP031380831.

Koetter, R., et al. "Turbo equalization," Signal Processing Magazine, IEEE, vol. 21, No. 1, pp. 67-80, Jan. 2004.

Cavus, F, et al., "Low BER performance estimation of LDPC codes via application of importance sampling to trapping sets," IEEE Transactions on Communications, vol. 57, No. 7, pp. 1886-1888, Jul. 2009.

Ryan, W. E., et al., "Channel Codes: Classical and Modern," Cambridge University Press, 2009, 710 pages.

K. Gunnam et al., "Value-Reuse Properties of Min-Sum for GF(q)" (dated Oct. 2006) Dept. of ECE, Texas A&M University Technical Note, published about Aug. 2010.

K. Gunnam et al., "Value-Reuse Properties of Min-Sum for GF (q)" (dated Jul. 2008) Dept. of ECE, Texas A&M University Technical Note, published about Aug. 2010.

K. Gunnam "Area and Energy Efficient VLSI Architectures for Low-Density Parity-Check Decoders Using an On-The-Fly Computation" dissertation at Texas A&M University, Dec. 2006.

Casado, V., et al., "Informed Dynamic Scheduling for Belief-Propagation Decoding of LDPC Codes," IEEE International Conference on Communications, Jun. 24-28, 2007, pp. 932-937.

Presman, N., et al., "Efficient Layers-based Schedules for Iterative Decoding of LDPC Codes," IEEE International Symposium on Information Theory, Jul. 6-11, 2008, pp. 1148-1152.

Radosavljevic, P., et al., "Optimized Message Passing Schedules for LDPC Decoding," Conference Record of the Thirty-Ninth Asilomar conference on Signals, Systems and Computers, Oct. 28, 2005-Nov. 1, 2005, pp. 591-595.

Zheng, H., et al., "MMSE-Based Design of Scaled and Offset BP-Based Decoding Algorithms on the Fast Rayleigh Fading Channel," IEEE International Symposium on Circuits and Systems, May 24, 2006, pp. 2061-2064.

Sakai, R., et al., "Reduced Complexity Decoding Based on Approximation of Update Function for Low-Density Parity-Check Codes," Transactions of the Institute of Electronics, Information and Communication Engineers, Feb. 1, 2007, vol. J90-A, No. 2, pp. 83-91.

Chen, J., et al., "Density Evolution for Two Improved Bp-Based Decoding Algorithms of LDPC Codes," Communications Letters, IEEE, May 2002, vol. 6, No. 5, pp. 208-210.

Chen, J., et al., "Near Optimum Universal Belief Propagation Based Decoding of Low-Density Parity Check Codes," IEEE Transations on Communications Letters, Mar. 2002, vol. 50, No. 3, pp. 406-414.

Karkooti, M., et al., "Semi-Parallel Reconfigurable Architectures for Real-Time LDPC Decoding," Information International Conference on Technology: Coding and Computing Proceedings, Apr. 2004, vol. 1, pp. 579-585.

Tzu-chieh, K., "Flexible Decoder Architectures for Irregular QC-LDPC Code," 51st Midwest Symposium on Circuits and Systems, Aug. 10-13, 2008, pp. 229-232.

\* cited by examiner

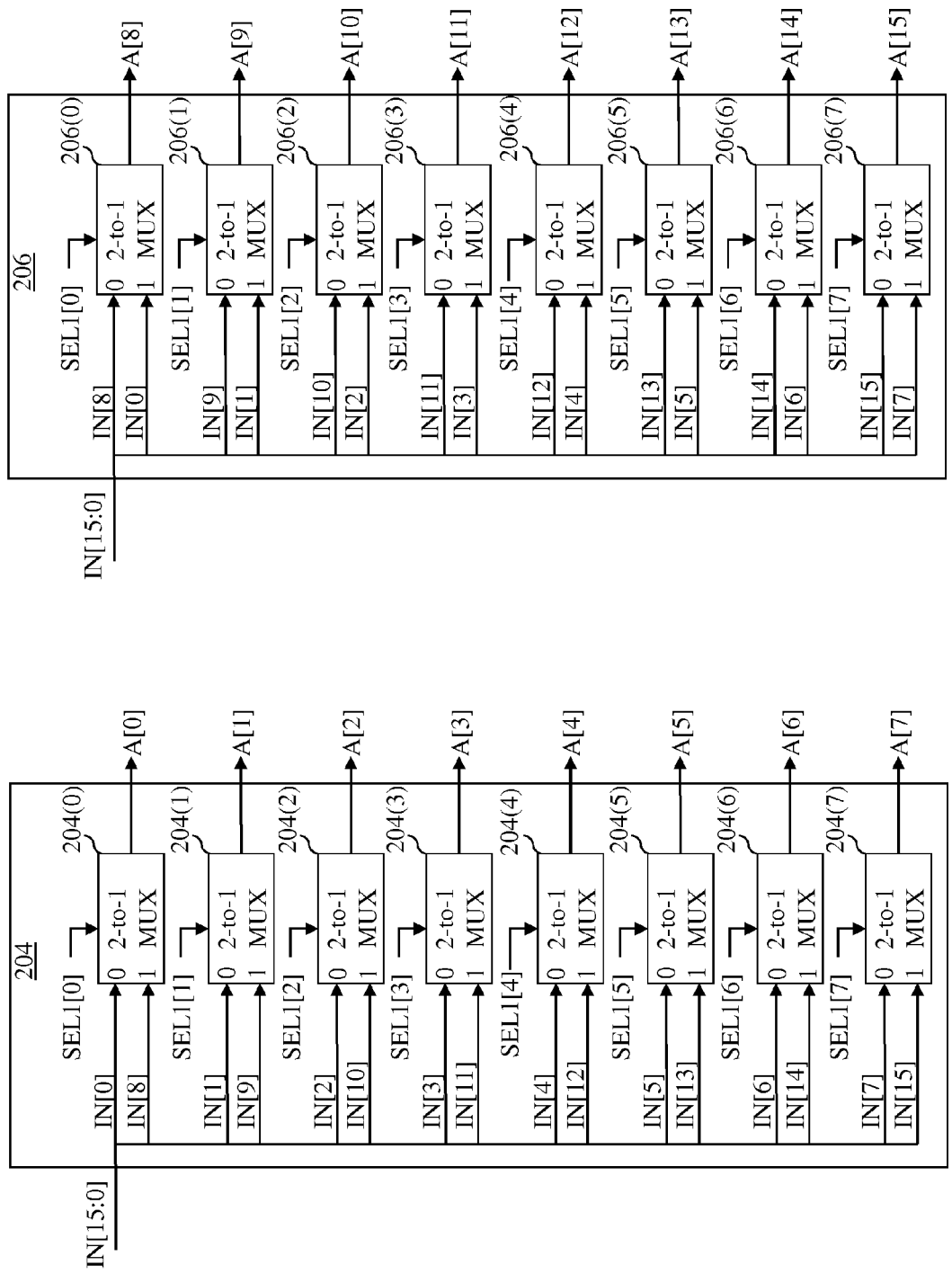

TABLE 1: Exemplary Cyclic Shift in the First Operating Mode

| Input Value | Output of Pre-mux 204 | Output of Pre-mux 210 | Output of Cyclic Shifter 218 |
|---|---|---|---|
| IN[0] | A[0]=IN[0] | B[0]=A[0]=IN[0] | OUT[0]=B[2]=A[2]=IN[2] |
| IN[1] | A[1]=IN[1] | B[1]=A[1]=IN[1] | OUT[1]=B[3]=A[3]=IN[3] |
| IN[2] | A[2]=IN[2] | B[2]=A[2]=IN[2] | OUT[2]=B[0]=A[0]=IN[0] |
| IN[3] | A[3]=IN[3] | B[3]=A[3]=IN[3] | OUT[3]=B[1]=A[1]=IN[1] |
| | Output of Pre-mux 206 | Output of Pre-mux 212 | Output of Cyclic Shifter 220 |
| IN[4] | A[4]=IN[4] | B[4]=A[4]=IN[4] | OUT[4]=B[7]=A[7]=IN[7] |
| IN[5] | A[5]=IN[5] | B[5]=A[5]=IN[5] | OUT[5]=B[4]=A[4]=IN[4] |
| IN[6] | A[6]=IN[6] | B[6]=A[6]=IN[6] | OUT[6]=B[5]=A[5]=IN[5] |
| IN[7] | A[7]=IN[7] | B[7]=A[7]=IN[7] | OUT[7]=B[6]=A[6]=IN[6] |
| | Output of Pre-mux 206 | Output of Pre-mux 214 | Output of Cyclic Shifter 222 |
| IN[8] | A[8]=IN[8] | B[8]=A[8]=IN[8] | OUT[8]=B[8]=A[8]=IN[8] |
| IN[9] | A[9]=IN[9] | B[9]=A[9]=IN[9] | OUT[9]=B[9]=A[9]=IN[9] |
| IN[10] | A[10]=IN[10] | B[10]=A[10]=IN[10] | OUT[10]=B[10]=A[10]=IN[10] |
| IN[11] | A[11]=IN[11] | B[11]=A[11]=IN[11] | OUT[11]=B[11]=A[11]=IN[11] |
| | | Output of Pre-mux 216 | Output of Cyclic Shifter 224 |
| IN[12] | A[12]=IN[12] | B[12]=A[12]=IN[12] | OUT[12]=B[13]=A[13]=IN[13] |
| IN[13] | A[13]=IN[13] | B[13]=A[13]=IN[13] | OUT[13]=B[14]=A[14]=IN[14] |
| IN[14] | A[14]=IN[14] | B[14]=A[14]=IN[14] | OUT[14]=B[15]=A[15]=IN[15] |
| IN[15] | A[15]=IN[15] | B[15]=A[15]=IN[15] | OUT[15]=B[12]=A[12]=IN[12] |

FIG. 2(f)

TABLE II: Exemplary Cyclic Shift in the Second Operating Mode

| Input Value | Output of Pre-mux 204 | Output of Pre-mux 210 | Output of Cyclic Shifter 218 |
|---|---|---|---|
| IN[0] | A[0]=IN[0] | B[0]=A[4]=IN[4] | OUT[0]=B[2]=A[2]=IN[2] |
| IN[1] | A[1]=IN[1] | B[1]=A[5]=IN[5] | OUT[1]=B[3]=A[3]=IN[3] |
| IN[2] | A[2]=IN[2] | B[2]=A[2]=IN[2] | OUT[2]=B[0]=A[4]=IN[4] |
| IN[3] | A[3]=IN[3] | B[3]=A[3]=IN[3] | OUT[3]=B[1]=A[5]=IN[5] |
|  | Output of Pre-mux 206 | Output of Pre-mux 212 | Output of Cyclic Shifter 220 |
| IN[4] | A[4]=IN[4] | B[4]=A[0]=IN[0] | OUT[4]=B[6]=A[6]=IN[6] |
| IN[5] | A[5]=IN[5] | B[5]=A[1]=IN[1] | OUT[5]=B[7]=A[7]=IN[7] |
| IN[6] | A[6]=IN[6] | B[6]=A[6]=IN[6] | OUT[6]=B[4]=A[0]=IN[0] |
| IN[7] | A[7]=IN[7] | B[7]=A[7]=IN[7] | OUT[7]=B[5]=A[1]=IN[1] |
|  | Output of Pre-mux 208 | Output of Pre-mux 214 | Output of Cyclic Shifter 222 |
| IN[8] | A[8]=IN[8] | B[8]=A[12]=IN[12] | OUT[8]=B[8]=A[12]=IN[12] |
| IN[9] | A[9]=IN[9] | B[9]=A[13]=IN[13] | OUT[9]=B[9]=A[13]=IN[13] |
| IN[10] | A[10]=IN[10] | B[10]=A[14]=IN[14] | OUT[10]=B[10]=A[14]=IN[14] |
| IN[11] | A[11]=IN[11] | B[11]=A[15]=IN[15] | OUT[11]=B[11]=A[15]=IN[15] |
|  |  | Output of Pre-mux 216 | Output of Cyclic Shifter 224 |
| IN[12] | A[12]=IN[12] | B[12]=A[8]=IN[8] | OUT[12]= B[12]=A[8]=IN[8] |
| IN[13] | A[13]=IN[13] | B[13]=A[9]=IN[9] | OUT[13]= B[13]=A[9]=IN[9] |
| IN[14] | A[14]=IN[14] | B[14]=A[10]=IN[10] | OUT[14]=B[14]=A[10]=IN[10] |
| IN[15] | A[15]=IN[15] | B[15]=A[11]=IN[11] | OUT[15]=B[15]=A[11]=IN[11] |

FIG. 2(f)

TABLE III. Exemplary Cyclic Shift in the Third Operating Mode

| Input Value | Output of Pre-mux 204 | Output of Pre-mux 210 | Output of Cyclic Shifter 218 |
|---|---|---|---|
| IN[0] | A[0]=IN[8] | B[0]=A[4]=IN[4] | OUT[0]=B[2]=A[2]=IN[2] |
| IN[1] | A[1]=IN[9] | B[1]=A[5]=IN[5] | OUT[1]=B[3]=A[3]=IN[3] |
| IN[2] | A[2]=IN[2] | B[2]=A[0]=IN[0] | OUT[2]=B[0]=A[4]=IN[4] |
| IN[3] | A[3]=IN[3] | B[3]=A[1]=IN[1] | OUT[3]=B[1]=A[5]=IN[5] |
|  | Output of Pre-mux 206 | Output of Pre-mux 212 | Output of Cyclic Shifter 220 |
| IN[4] | A[4]=IN[4] | B[4]=A[0]=IN[8] | OUT[4]=B[6]=A[6]=IN[6] |
| IN[5] | A[5]=IN[5] | B[5]=A[1]=IN[9] | OUT[5]=B[7]=A[7]=IN[7] |
| IN[6] | A[6]=IN[6] | B[6]=A[6]=IN[6] | OUT[6]=B[4]=A[0]=IN[8] |
| IN[7] | A[7]=IN[7] | B[7]=A[7]=IN[7] | OUT[7]=B[5]=A[1]=IN[9] |
|  | Output of Pre-mux 206 | Output of Pre-mux 214 | Output of Cyclic Shifter 222 |
| IN[8] | A[8]=IN[0] | B[8]=A[12]=IN[12] | OUT[8]=B[10]=A[10]=IN[10] |
| IN[9] | A[9]=IN[1] | B[9]=A[13]=IN[13] | OUT[9]=B[11]=A[11]=IN[11] |
| IN[10] | A[10]=IN[10] | B[10]=A[10]=IN[10] | OUT[10]=B[8]=A[12]=IN[12] |
| IN[11] | A[11]=IN[11] | B[11]=A[11]=IN[11] | OUT[11]=B[9]=A[13]=IN[13] |
|  |  | Output of Pre-mux 216 | Output of Cyclic Shifter 224 |
| IN[12] | A[12]=IN[12] | B[12]=A[8]=IN[0] | OUT[12]=B[14]=A[14]=IN[14] |
| IN[13] | A[13]=IN[13] | B[13]=A[9]=IN[1] | OUT[13]=B[15]=A[15]=IN[15] |
| IN[14] | A[14]=IN[14] | B[14]=A[14]=IN[14] | OUT[14]=B[12]=A[8]=IN[0] |
| IN[15] | A[15]=IN[15] | B[15]=A[15]=IN[15] | OUT[15]=B[13]=A[9]=IN[1] |

FIG. 2(j)

| TABLE IV: Operating Modes of Reconfigurable Cyclic Shifter Arrangement 100 | | |
|---|---|---|
| Arrangement 100 Mode | RCS1 104 Mode | RCS2 106 Mode |
| 1 | One 16x16 Cyclic Shifter | One 16x16 Cyclic Shifter |
| 2 | One 16x16 Cyclic Shifter | Two 8x8 cyclic shifters |
| 3 | One 16x16 Cyclic Shifter | Four 4x4 cyclic shifters |
| 4 | Two 8x8 cyclic shifters | One 16x16 Cyclic Shifter |
| 5 | Two 8x8 cyclic shifters | Two 8x8 cyclic shifters |
| 6 | Two 8x8 cyclic shifters | Four 4x4 cyclic shifters |
| 7 | Four 4x4 cyclic shifters | One 16x16 Cyclic Shifter |
| 8 | Four 4x4 cyclic shifters | Two 8x8 cyclic shifters |
| 9 | Four 4x4 cyclic shifters | Four 4x4 cyclic shifters |

FIG. 3

Table V: Exemplary Cyclic-Shifting Scenarios

| Scenario | Input Values | RCS1 | | RCS2 | |
|---|---|---|---|---|---|
| | | Mode | OUT1 | Mode | OUT2 |
| 1 | 16 unshifted input values | One 16x16 cyclic shifter; shift value=S | 16 input values shifted by S | One 16x16 cyclic shifter; shift value=N-S | 16 unshifted input values |
| 2 | 16 input values shifted by S | One 16x16 cyclic shifter; shift value=S'-S | 16 input values shifted by S' | One 16x16 cyclic shifter; shift value=N-S | 16 unshifted input values |
| 3 | 16 input values shifted by S | One 16x16 cyclic shifter; shift value=N-S | 16 unshifted input values | Four 4x4 cyclic shifters; shift values= S1, S2, S3, & S4 | four sets of four input values shifted by S1, S2, S3, & S4 |
| 4 | four sets of four input values shifted by S1, S2, S3, & S4 | Four 4 cyclic shifters; shift values= N/4-S1, N/4-S2, N/4-S3, & N/4-S4 | Four sets of four unshifted input values | Four 4x4 cyclic shifters; shift values= S1', S2', S3', & S4' | Four sets of four input values shifted by S1', S2', S3', & S4' |
| 5 | Four sets of four input values shifted by S1, S2, S3, & S4 | Four cyclic shifters; shift values=N/4-S1, N/4-S2, N/4-S3, N/4-S4 | Four sets of four unshifted input values | One 16x16 cyclic shifter; shift value=S | 16 input values shifted by S |

FIG. 4

RECONFIGURABLE CYCLIC SHIFTER ARRANGEMENT

CROSS REFERENCE TO RELATED APPLICATIONS

The subject matter of this application is related to U.S. patent application Ser. No. 12/113,729 filed on May 1, 2008, U.S. patent application Ser. No. 12/113,755 filed on May 1, 2008, and U.S. patent application Ser. No. 12/826,026 filed on Jun. 29, 2010, the teachings of all of which are incorporated herein by reference in their entirety.

BACKGROUND OF THE INVENTION

1. Field of the Invention

The present invention relates to signal processing, and, in particular, to the rearranging of data values.

2. Description of the Related Art

Cyclic shifting, also known as circular shifting, is a technique well known in the art of signal processing that is used to rearrange data values. Cyclic shifting is performed by receiving a set of data values in a particular order, and shifting the data values either up, down, right, or left by a specified number of positions. Data values at the end of the set are removed and appended to the beginning of the set. For a discussion of one embodiment of a cyclic shifter, see U.S. patent application Ser. No. 12/260,608 filed on Oct. 29, 2008, the teachings of which are incorporated herein by reference in their entirety.

SUMMARY OF THE INVENTION

In one embodiment, the present invention is an apparatus comprising a reconfigurable cyclic shifter arrangement. The reconfigurable cyclic shifter arrangement comprises a first reconfigurable cyclic shifter, a second reconfigurable cyclic shifter, and a controller. The first reconfigurable cyclic shifter is adapted to cyclically shift N input values, N≥4, to generate a first set of N output values. The second reconfigurable cyclic shifter is adapted to cyclically shift the first set of N output values to generate a second set of N output values. The controller is adapted to selectively configure (i) the first reconfigurable cyclic shifter to operate in any one of at least first and second operating modes and (ii) the second reconfigurable cyclic shifter to operate in any one of the at least first and second operating modes, independent of the configuration of the first reconfigurable cyclic shifter. In the first operating mode, a reconfigurable cyclic shifter is configured to operate as a first set of cyclic shifters, the first set comprising one or more independent cyclic shifters, to independently cyclically shift one or more different subsets of N values. In the second operating mode, a reconfigurable cyclic shifter is configured to operate as a second set of cyclic shifters, the second set comprising two or more independent cyclic shifters, to independently cyclically shift two or more different subsets of N values. The number of independent cyclic shifters in the second set is greater than the number of independent cyclic shifters in the first set.

In another embodiment, the present invention is an apparatus comprising a reconfigurable cyclic shifter arrangement. The reconfigurable cyclic shifter arrangement comprises a first shifting means, a second shifting means, and a controlling means. The first shifting means is for cyclically shifting N input values, N>≥4, to generate a first set of N output values. The second shifting means is for cyclically shifting the first set of N output values to generate a second set of N output values. The control means is for selectively configuring (i) the first means to operate in any one of at least first and second operating modes and (ii) the second means to operate in any one of the at least first and second operating modes, independent of the configuration of the first means. In the first operating mode, the shifting means operates as a first set of cyclic shifters, the first set comprising one or more independent cyclic shifters, to independently cyclically shift one or more different subsets of N values. In the second operating mode, the shifting means operates as a second set of cyclic shifters, the second set comprising two or more independent cyclic shifters, to independently cyclically shift two or more different subsets of N values. The number of independent cyclic shifters in the second set is greater than the number of independent cyclic shifters in the first set.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 2(b) shows a simplified block diagram of pre-multiplexer 204 in FIG. 2(a) according to one embodiment of the present invention;

FIG. 2(c) shows a simplified block diagram of pre-multiplexer 206 in FIG. 2(a) according to one embodiment of the present invention;

FIG. 2(h) shows Table I, which illustrates an exemplary shift operation of the reconfigurable cyclic shifter of FIG. 2(a) in the first operating mode, in which the reconfigurable cyclic shifter operates as four independent 4×4 cyclic shifters;

FIG. 2(i) shows Table II, which illustrates an exemplary shift operation of the reconfigurable cyclic shifter of FIG. 2(a) in the second operating mode, in which the reconfigurable cyclic shifter operates as two independent 8×8 cyclic shifters;

FIG. 2(j) shows Table III, which illustrates an exemplary shift operation of the reconfigurable cyclic shifter of FIG. 2(a) in the third operating mode, in which the reconfigurable cyclic shifter operates as one 16×16 cyclic shifter;

FIG. 3 shows Table IV, which summarizes the nine different operating modes of the reconfigurable cyclic shifter arrangement of FIG. 1;

FIG. 4 shows Table V, which summarizes four exemplary cyclic-shifting scenarios that may be implemented by the reconfigurable cyclic shifter arrangement of FIG. 1.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Figure 1:
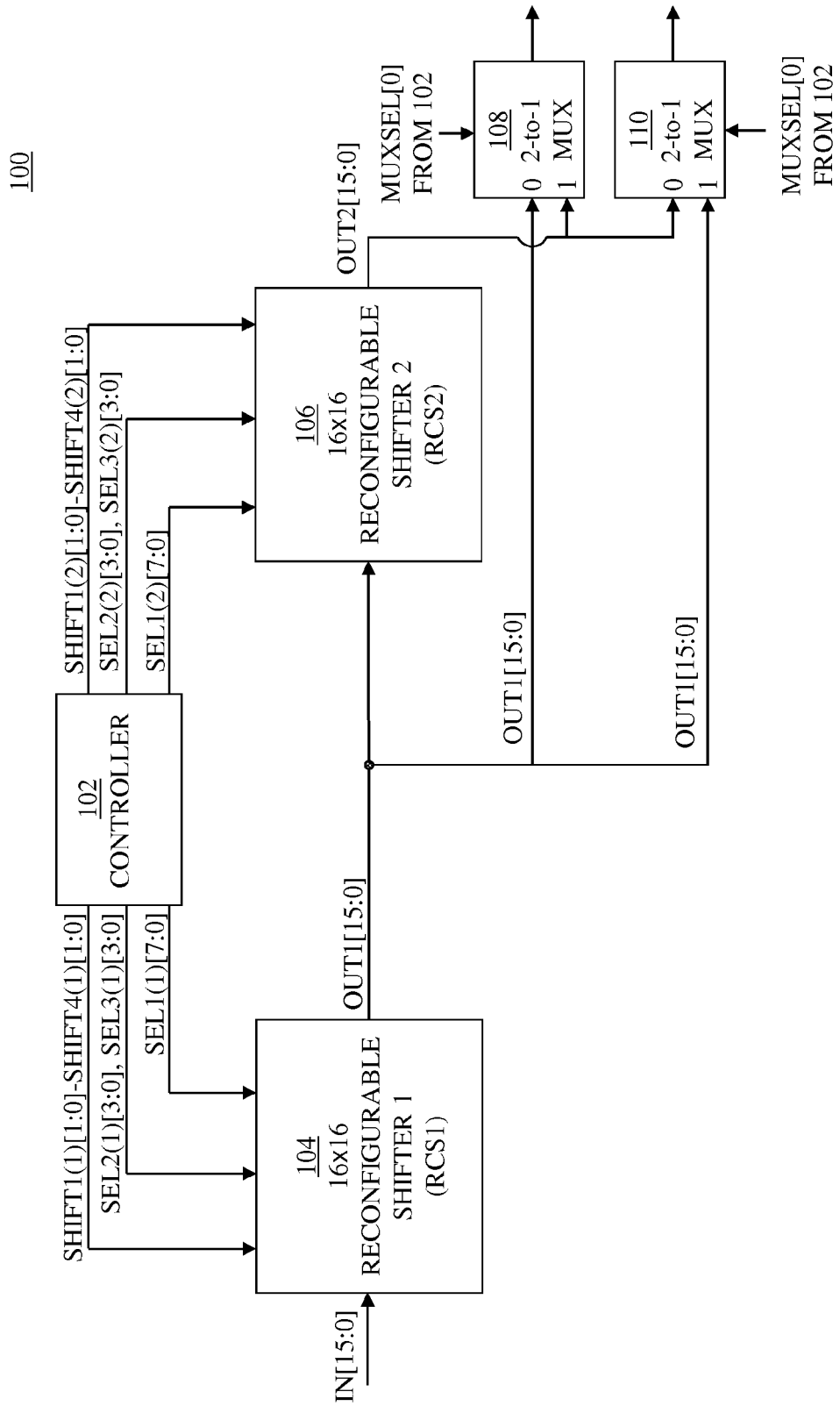
FIG. 1 shows a simplified block diagram of a reconfigurable cyclic shifter arrangement according to one embodiment of the present invention.

FIG. 1 shows a simplified block diagram of a reconfigurable cyclic shifter arrangement 100 according to one embodiment of the present invention. Reconfigurable cyclic shifter arrangement 100 has first reconfigurable cyclic shifter (RCS1) 104 and second reconfigurable cyclic shifter (RCS2) 106, which is connected in series with first reconfigurable cyclic shifter 104. Reconfigurable cyclic shifter arrangement 100 also has two two-input-to-one-output (i.e., 2×1) multiplexers 108 and 110, each of which is connected to receive the outputs of first reconfigurable cyclic shifter 104 and second reconfigurable cyclic shifter 106. An exemplary embodiment of a reconfigurable cyclic shifter that may be used to implement each of first reconfigurable cyclic shifter 104 and second reconfigurable cyclic shifter 106 is discussed in further detail below in relation to FIGS. 2(a) to 2(g).

First reconfigurable cyclic shifter 104 receives a set of 16 input values IN[15:0], where, depending on the particular application for arrangement 100, each input value may be an individual bit, several bits, a sample, a log-likelihood ratio (LLR), or any other suitable input value. The set of 16 input values IN[15:0] is cyclically shifted by first reconfigurable cyclic shifter 104, which is selectively configurable to operate in any one of three different operating modes at a time, to generate a first set of 16 cyclically-shifted output values OUT1[15:0]. The first set of 16 cyclically-shifted output values OUT1[15:0] is then provided to second reconfigurable cyclic shifter 106, first multiplexer 108, and second multiplexer 110.

The three operating modes of first reconfigurable cyclic shifter 104 are selectively configured using an eight-bit control signal SEL1(1)[7:0] and two four-bit control signals SEL2(1)[3:0] and SEL3(1)[3:0], the values of which are determined by controller 102. In the first operating mode, first reconfigurable cyclic shifter 104 is configured to operate as four independent 4×4 cyclic shifters, each of which cyclically shifts a different subset of four of the 16 input values IN[15:0] at a time. In the second operating mode, first reconfigurable cyclic shifter 104 is configured to operate as two independent 8×8 cyclic shifters, each of which cyclically shifts a different subset of eight of the 16 input values at a time. In the third operating mode, first reconfigurable cyclic shifter 104 is configured to operate as one 16×16 cyclic shifter to cyclically shift the whole set of 16 input values at one time. The amount of cyclic shifting that first reconfigurable cyclic shifter 104 performs on each set or subset of input values is controlled by controller 102 using four two-bit control signals SHIFT1(1)[1:0], SHIFT2(1)[1:0], SHIFT3(1)[1:0], and SHIFT4(1)[1:0], together with control signals SEL1(1)[7:0], SEL2(1)[3:0], and SEL3(1)[3:0].

Second reconfigurable cyclic shifter 106, which is also selectively configurable to operate in any one of three different operating modes, cyclically shifts the first set of 16 cyclically-shifted output values OUT1[15:0] using any one of the three different operating modes to generate a second set of 16 cyclically-shifted output values OUT2[15:0]. Similar to the three operating modes of first reconfigurable cyclic shifter 104, the three operating modes of second reconfigurable cyclic shifter 106 include (i) a first mode in which second reconfigurable cyclic shifter 106 is configured to operate as four independent 4×4 cyclic shifters, (ii) a second mode in which second reconfigurable cyclic shifter 106 is configured to operate as two independent 8×8 cyclic shifters, and (iii) a third mode in which second reconfigurable cyclic shifter 106 is configured to operate as one 16×16 cyclic shifter. Further, similar to first reconfigurable cyclic shifter 104, second reconfigurable cyclic shifter 106 is controlled using an eight-bit control signal SEL1(2)[7:0], two four-bit control signals SEL2(2)[3:0] and SEL3(2)[3:0], and four two-bit control signals SHIFT1(2)[1:0], SHIFT2(2)[1:0], SHIFT3(2)[1:0], and SHIFT4(2)[1:0], the values of which are determined by controller 102.

The first and second sets of 16 cyclically-shifted output values OUT1[15:0] and OUT2[15:0] are received via the upper and lower input ports of first multiplexer 108, respectively, and the lower and upper input ports of second multiplexer 110, respectively. First multiplexer 108 receives a one-bit control signal MUXSEL[0] from controller 102, and outputs one of the first and second sets of output values to downstream processing (not shown) in a first data path. Second multiplexer 110, which also receives control signal MUXSEL[0] from controller 102, outputs the remaining one of the first and second sets of output values to downstream processing (not shown) in a second data path, different from the first data path. The particular data path to which the first and second sets of 16 cyclically-shifted output values OUT1[15:0] and OUT2[15:0] are provided is determined based on the need of the downstream processing in each data path. For example, in some instances, downstream processing in the first data path may need the first set of 16 cyclically-shifted output values OUT1[15:0], while, in other instances, that downstream processing may need the second set of 16 cyclically-shifted output values OUT2[15:0].

Figure 2A:
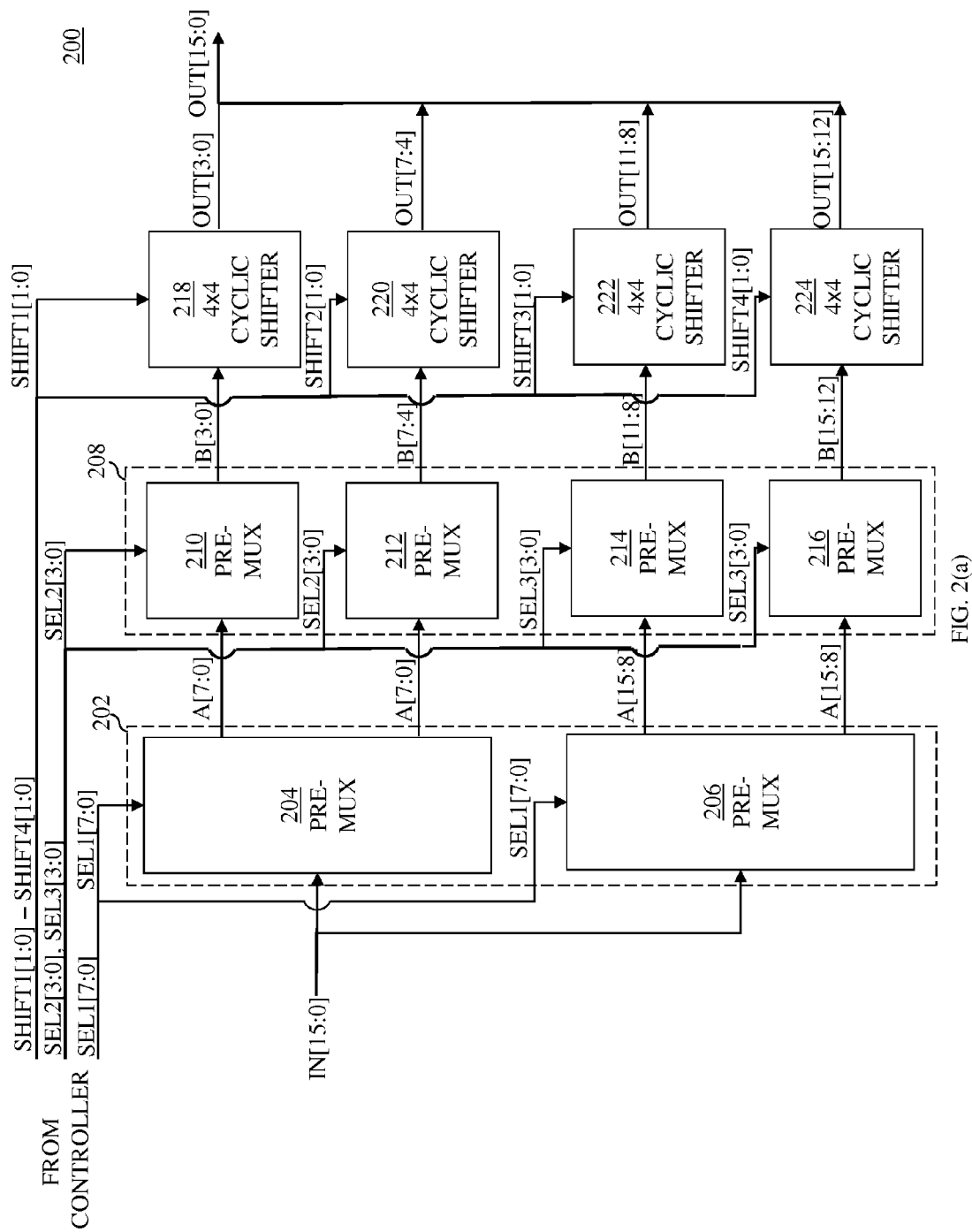
FIG. 2(a) shows a simplified block diagram of a reconfigurable cyclic shifter that may be used to implement each of the reconfigurable cyclic shifters in FIG. 1 according to one embodiment of the present invention.
Figure 2E:
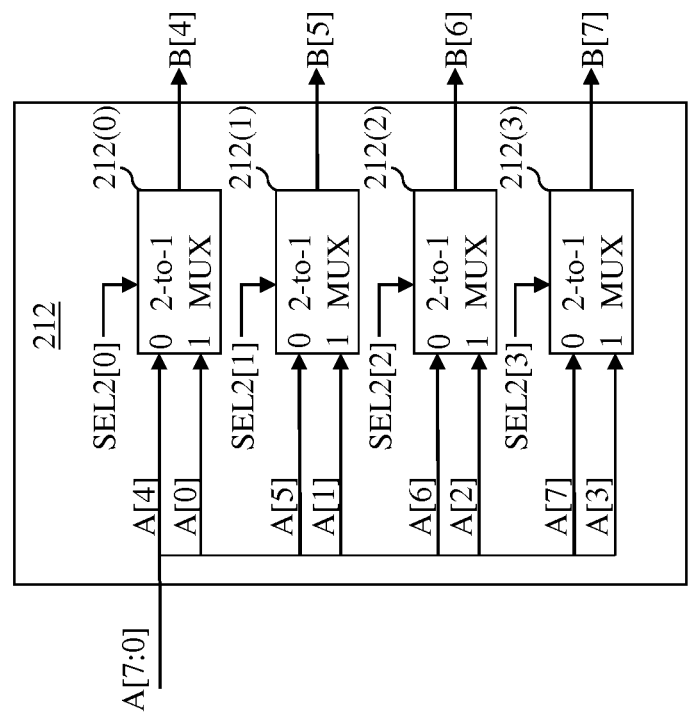
FIGS. 2(d) to 2(g) show simplified block diagrams of pre-multiplexers 210, 212, 214, and 216, respectively, in FIG. 2(a) according to one embodiment of the present invention.
Figure 2D:
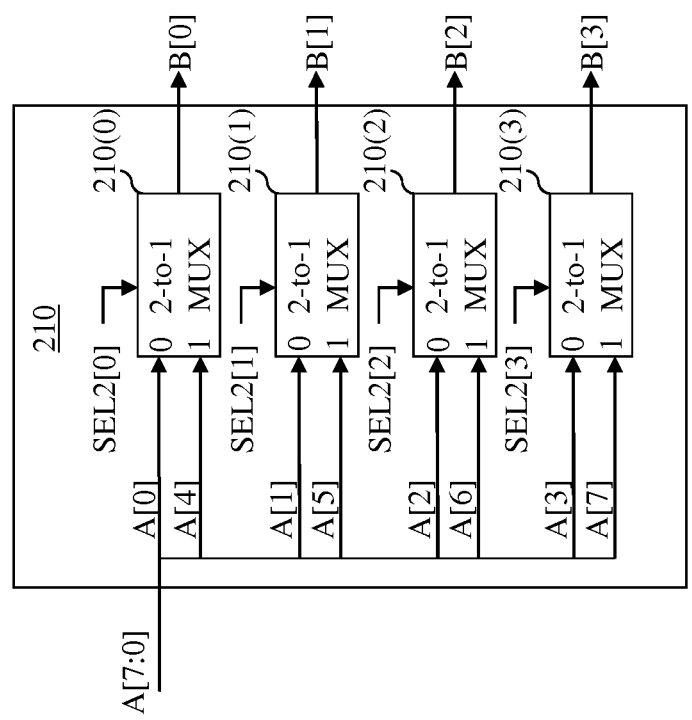
Figures 2F, 2G:
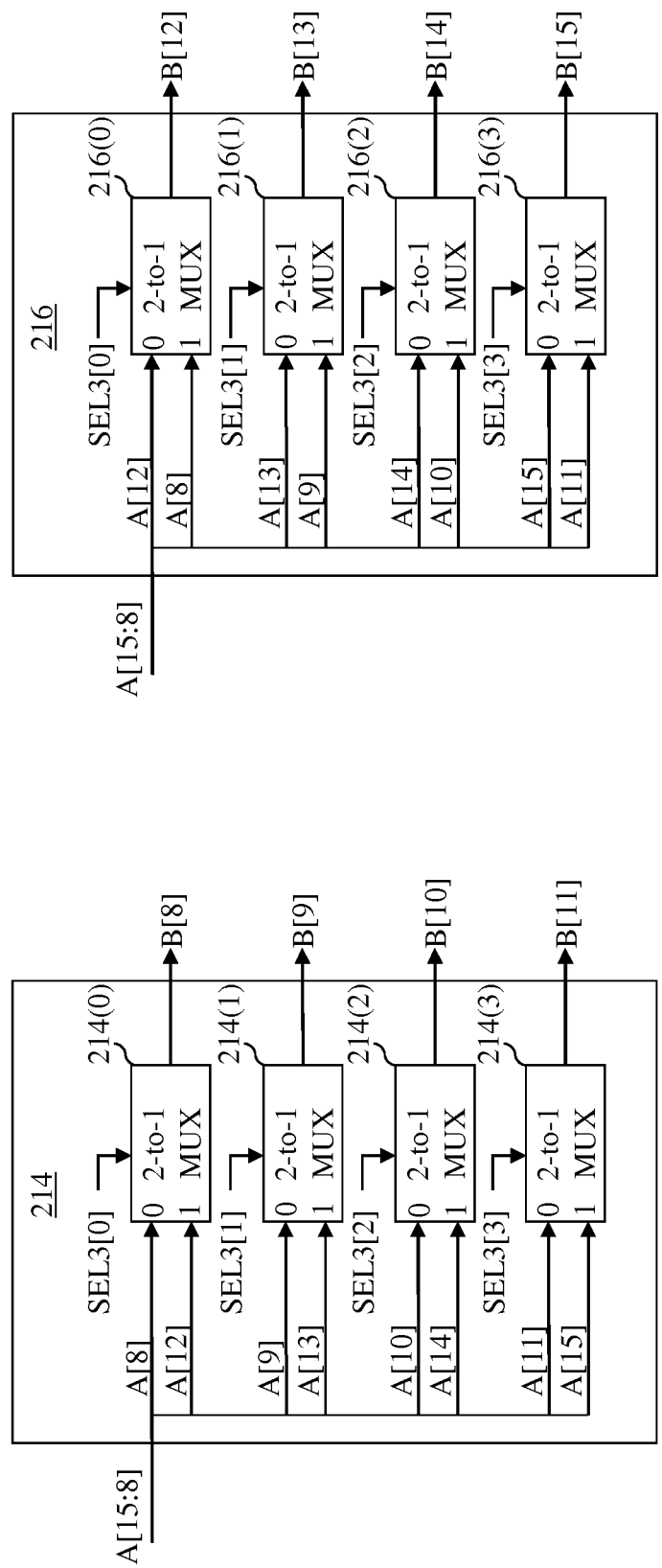

To further understand the operations of first and second reconfigurable cyclic shifters 104 and 106, consider FIGS. 2(a) to 2(g). FIG. 2(a) shows a simplified block diagram of a reconfigurable cyclic shifter 200 that may be used to implement each of reconfigurable cyclic shifters 104 and 106 in FIG. 1 according to one embodiment of the present invention. Reconfigurable cyclic shifter 200 has four 4×4 cyclic shifters 218, 220, 222, and 224, each of which cyclically shifts a set of four values (B) to generate a set of four cyclically-shifted values (OUT). Cyclic shifters 218, 220, 222, and 224 may be implemented using any suitable cyclic shifter. For example, cyclic shifters 218, 220, 222, and 224 may be implemented in a manner similar to that of the 72×72 cyclic shifter in FIG. 3 of U.S. patent application Ser. No. 12/260,608, albeit with four inputs and outputs rather than 72 inputs and outputs and with two stages rather than six stages.

In addition to cyclic shifters 218, 220, 222, and 224, reconfigurable cyclic shifter 200 has two pre-multiplexer stages 202 and 208 that enable reconfigurable cyclic shifter 200 to be operated in the three different operating modes described above. First pre-multiplexer stage 202 comprises pre-multiplexers 204 and 206, and second pre-multiplexer stage 208 comprises pre-multiplexers 210, 212, 214, and 216.

At any point in time, reconfigurable cyclic shifter 200 is selectively configured to operate in one of the first, second, or third operating modes using (i) eight-bit control signal SEL1[7:0], which is provided to pre-multiplexers 204 and 206, (ii) four-bit control signal SEL2[3:0], which is provided to pre-multiplexers 210 and 212, and (iii) four-bit control signal SEL3[3:0], which is provided to pre-multiplexers 214 and 216. In addition to being used to select the operating mode, control signals SEL1[7:0], SEL2[3:0], and SEL3[3:0] are used together with four two-bit control signals SHIFT1[1:0] to SHIFT4[1:0], which are provided to cyclic shifters 218, 220, 222, and 224, respectively, to control the amount of cyclic shifting that reconfigurable cyclic shifter 200 performs on the input data. Control signals SEL1[7:0], SEL2[3:0], SEL3[3:0], and SHIFT1[1:0] to SHIFT4[1:0] correspond to (i) control signals SEL1(1)[7:0], SEL2(1)[3:0], SEL3(1)[3:0], and SHIFT1(1)[1:0] to SHIFT4(1)[1:0], respectively, when reconfigurable cyclic shifter 200 is used to implement first reconfigurable cyclic shifter 104 in FIG. 1, and (ii) control signals SEL1(2)[7:0], SEL2(2)[3:0], SEL3(2)[3:0], and SHIFT1(2)[1:0] to SHIFT4(2)[1:0], respectively, when reconfigurable cyclic shifter 200 is used to implement second reconfigurable cyclic shifter 106.

To further understand the operation of pre-multiplexer 204 and pre-multiplexer 206, consider FIG. 2(*b*) and FIG. 2(*c*), respectively. FIG. 2(*b*) shows a simplified block diagram of pre-multiplexer 204 in FIG. 2(*a*) according to one embodiment of the present invention. As shown, pre-multiplexer 204 receives 16 input values IN[15:0], where each input value may be an individual bit, several bits, a sample, a log-likelihood ratio (LLR), or any other suitable input value. Input values IN[15:0], which may be received in parallel or in series, are provided to eight multiplexers 204(0) to 204(7) such that (i) input values IN[0] to IN[7] are provided to the upper inputs of multiplexers 204(0) to 204(7), respectively, and (ii) input values IN[8] to IN[15] are provided to the lower inputs of multiplexers 204(0) to 204(7), respectively.

In addition to receiving input values, multiplexers 204(0) to 204(7) receive bits SEL1[0] to SEL1[7] of control signal SEL1[7:0], respectively. Each multiplexer 204(0) to 204(7) outputs one of the two input values that it receives as one of the first stage output values A[0] to A[7] based on the value of the bit of control signal SEL1[7:0] that it receives. Thus, when a bit of control signal SEL1[7:0] has a value of zero, the upper input of the corresponding multiplexer 204(0) to 204(7) is output as the corresponding first stage output value A[i], and, when a bit of control signal SEL1[7:0] has a value of one, the lower input of the corresponding multiplexer 204(0) to 204(7) is output as the corresponding first stage output value A[i].

FIG. 2(*c*) shows a simplified block diagram of pre-multiplexer 206 in FIG. 2(*a*) according to one embodiment of the present invention. Similar to pre-multiplexer 204 of FIG. 2(*b*), pre-multiplexer 206 has eight multiplexers 206(0) to 206(7), each of which (i) receives two of the 16 input values IN[15:0] and one bit of the eight-bit control signal SEL1[7:0] and (ii) outputs one first stage output value A[i]. However, as shown in FIG. 2(*c*), the order in which each pair of input values IN[15:0] is provided to each multiplexer 206(0) to 206(7) is reversed such that (i) input values IN[8] to IN[15] are provided to the upper inputs of multiplexers 206(0) to 206(7), respectively, and (ii) input values IN[0] to IN[7] are provided to the lower inputs of multiplexers 206(0) to 206(7), respectively.

As it can be seen by comparing FIGS. 2(*b*) and 2(*c*), when one input value in a pair of input values is output from a multiplexer of pre-multiplexer 204, the other input value in the pair of input values is output from a corresponding multiplexer of pre-multiplexer 206. For example, consider multiplexers 204(0) and 206(0), both of which receive input values IN[0] and IN[8]. When control bit SEL1[0]=0, input value IN[0] is output from multiplexer 204(0) as first stage output value A[0], and input value IN[8] is output from multiplexer 206(0) as first stage output value A[8]. When control bit SEL1[0]=1, input value IN[8] is output from multiplexer 204(0) as first stage output value A[0], and input value IN[0] is output from multiplexer 206(0) as first stage output value A[8].

Referring back go FIG. 2(*a*), first stage output values A[15:0] are provided in series or in parallel to second stage 208 of pre-multiplexers such that (i) first stage output values A[7:0] are provided to pre-multiplexers 210 and 212 and (ii) first stage output values A[15:8] are provided to pre-multiplexers 214 and 216. Pre-multiplexer 210 selects four of the first stage output values A[7:0] to output as second stage output B[3:0], and pre-multiplexer 212 selects the remaining four of the first stage output values A[7:0] to output as second stage output B[7:4]. Similarly, pre-multiplexer 214 selects four of the first stage output values A[15:8] to output as second stage output B[11:8], and pre-multiplexer 216 selects the remaining four of the first stage output values A[15:8] to output as second stage output B[15:12]. To further understand the operation of pre-multiplexers 210 to 216, consider FIGS. 2(*d*) to 2(*g*).

FIGS. 2(*d*) to 2(*g*) show simplified block diagrams of pre-multiplexers 210, 212, 214, and 216, respectively, in FIG. 2(*a*) according to one embodiment of the present invention. As shown in FIG. 2(*d*), pre-multiplexer 210 receives first stage output values A[7:0] such that (i) values A[0] to A[3] are provided to the upper inputs of multiplexers 210(0) to 210(3), respectively, and (ii) values A[4] to A[7] are provided to the lower inputs of multiplexers 210(0) to 210(3), respectively. In addition to receiving first stage output values, multiplexers 210(0) to 210(3) receive bits SEL2[0] to SEL2[3], respectively, of control signal SEL2[3:0]. Each multiplexer **210(*i*) outputs one of the two first stage output values that it receives as a corresponding one of the second stage output values B[i] based on the value of control signal bit SEL2[i] that it receives. Thus, when control signal bit SEL2[i] has a value of zero, the upper input of multiplexer 210(*i*) is output as the second stage output value B[i], and, when control signal bit SEL2[i] has a value of one, the lower input of multiplexer 210(*i*)** is output as the second stage output value B[i].

Similar to pre-multiplexer 210, pre-multiplexer 212 of FIG. 2(*e*) has four multiplexers 212(0) to 212(3), each of which (i) receives two of the eight first stage output values A[7:0] and one bit of the control signal SEL2[3:0] and (ii) outputs a corresponding one of second stage output values B[7:4]. However, as shown in FIG. 2(*e*), the order in which each pair of first stage output values A[7:0] is provided to each multiplexer 212(0) to 212(3) is reversed such that (i) first stage output values A[4] to A[7] are provided to the upper inputs of multiplexers 212(0) to 212(3), respectively, and (ii) first stage output values A[0] to A[3] are provided to the lower inputs of multiplexers 212(0) to 212(3), respectively.

Pre-multiplexers 214 of FIGS. 2(*f*) and 216 of FIG. 2(*g*) operate in manners similar to those of pre-multiplexers 210 and 212, respectively. However, rather than receiving first stage output values A[7:0] and control signal SEL2[3:0], pre-multiplexers 214 and 216 receive first stage output values A[15:8] and control signal SEL3[3:0]. To further understand the operation of reconfigurable cyclic shifter 200 in the first, second, and third operating modes, consider FIGS. 2(*h*), 2(*i*), and 2(*j*), respectively.

FIG. 2(*h*) shows Table I, which illustrates an exemplary cyclic shift operation of reconfigurable cyclic shifter 200 in the first operating mode, in which reconfigurable cyclic shifter 200 operates as four independent 4×4 cyclic shifters. In the first operating mode, the controller sets all of the bits in control signal SEL1[7:0] equal to zero such that (i) multiplexers 204(0) to 204(7) of pre-multiplexer 204 output their upper input values IN[0] to IN[7] as first stage output values A[0] to A[7], respectively, to pre-multiplexers 210 and 212 and (ii) multiplexers 206(0) to 206(7) of pre-multiplexer 206 output their upper input values IN[8] to IN[15] as first stage output values A[8] to A[15], respectively, to pre-multiplexers 214 and 216 as shown in the second column of Table I. In addition, the controller sets all of the bits in control signals SEL2[3:0] and SEL3[3:0] equal to zero such that (i) multiplexers 210(0) to 210(3) of pre-multiplexer 210 output their upper inputs (i.e., A[0] to A[3]) as second stage output values B[0] to B[3], respectively, (ii) multiplexers 212(0) to 212(3) of pre-multiplexer 212 output their upper inputs (i.e., A[4] to A[7]) as second stage output values B[4] to B[7], respectively, (iii) multiplexers 214(0) to 214(3) of pre-multiplexer 214 output their upper inputs (i.e., A[8] to A[11]) as second stage output values B[8] to B[11], respectively, and (iv) multiplexers 216(0) to 216(3) of pre-multiplexer 216 output their upper inputs (i.e., A[12] to A[15]) as second stage output values B[12] to B[15], respectively, as shown in the third column of Table I.

After the first and second pre-multiplexing stages, cyclic shifters 218 to 224 may apply independent cyclic shifts to the second stage output values B that they receive. The fourth column of Table I shows one example of four independent cyclic shifts in which cyclic shifter 218 applies a cyclic downshift of two (which is equivalent to a cyclic upshift of two), cyclic shifter 220 applies a cyclic downshift of one (which is equivalent to a cyclic upshift of three), cyclic shifter 222 applies no shifting, and cyclic shifter 224 applies a cyclic downshift of three (which is equivalent to a cyclic upshift of one).

FIG. 2(*i*) shows Table II, which illustrates an exemplary shift operation of reconfigurable cyclic shifter 200 in the second operating mode, in which reconfigurable cyclic shifter 200 operates as two independent 8×8 cyclic shifters. In this example, reconfigurable cyclic shifter 200 performs a cyclic downshift of six on input values IN[0] to IN[7] (which is equivalent to a cyclic upshift of two) and a cyclic downshift of four on input values IN[8] to IN[15] (which is equivalent to a cyclic upshift of four).

Similar to the first operating mode, all of the bits in control signal SEL1[7:0] are set equal to zero in the second operating mode such that (i) multiplexers 204(0) to 204(7) of pre-multiplexer 204 output their upper input values IN[0] to IN[7] as first stage output values A[0] to A[7], respectively to pre-multiplexers 210 and 212 and (ii) multiplexers 206(0) to 206(7) of pre-multiplexer 206 output their upper input values IN[8] to IN[15] as first stage output values A[8] to A[15], respectively, to pre-multiplexers 214 and 216, as shown in the second column of Table II. However, unlike the first operating mode, all of the bits in control signals SEL2[3:0] and SEL3[3:0] are not set equal to zero. In this example, control signal SEL2[3:0] provided to pre-multiplexers 210 and 212 is set equal to 1100, and control signal SEL3[3:0] provided to pre-multiplexers 214 and 216 is set equal to 1111.

Referring to pre-multiplexers 210 and 212, as shown in the third column of Table II, first stage output values A[4] and A[5] (i.e., the lower inputs of multiplexers 210(0) and 210(1)) and first stage output values A[2] and A[3] (i.e., the upper inputs of multiplexers 210(2) and 210(3)) are output as second stage output values B[0] to B[3], respectively, to cyclic shifter 218. Further, first stage output values A[0] and A[1] (i.e., the lower inputs of multiplexers 212(0) and 212(1)) and first stage output values A[6] and A[7] (i.e., the upper inputs of multiplexers 212(2) and 212(3)) are output as second stage output values B[4] to B[7], respectively, to cyclic shifter 220. As shown in the fourth column, cyclic shifters 218 and 220 cyclically downshift their respective second stage output values by two (which is equivalent to cyclically upshifting by two) to generate output values OUT[0] to OUT[7], which represents a cyclic downshift of six on input values IN[0] to IN[7] (which is equivalent to a cyclic upshift of two).

Referring to pre-multiplexers 214 and 216, as shown in the third column of Table II, first stage output values A[12] to A[15] (i.e., the lower inputs of multiplexers 214(0) to 214(3)) are output as second stage output values B[8] to B[11], respectively, to cyclic shifter 222. Further, first stage output values A[8] to A[11] (i.e., the lower inputs of multiplexers 216(0) to 212(3)) are output as second stage output values B[12] to B[15], respectively, to cyclic shifter 224. As shown in the fourth column of Table II, second stage output values B[8] to B[15] represent a cyclic downshift of four on input values IN[8] to IN[15] (which is equivalent to a cyclic upshift of four). Thus, cyclic shifters 222 and 224 output second stage output values B[8] to B[15] as output values OUT[8] to OUT[15], respectively, without applying cyclic shifting (i.e., applying a cyclic shift of zero).

FIG. 2(*j*) shows Table III, which illustrates an exemplary shift operation of reconfigurable cyclic shifter 200 in the third operating mode, in which reconfigurable cyclic shifter 200 operates as one 16×16 cyclic shifter. In this example, reconfigurable cyclic shifter 200 performs a cyclic downshift of 14 on input values IN[0] to IN[15] (which is equivalent to a cyclic upshift of two). To achieve this cyclic downshift, control signal SEL1[7:0] provided to pre-multiplexers 204 and 206 is set equal to 11000000, control signal SEL2[3:0] provided to pre-multiplexers 210 and 212 is set equal to 1100, and control signal SEL3[3:0] provided to pre-multiplexers 214 and 216 is set equal to 1100.

Referring to pre-multiplexers 204 and 206, as shown in the second column of Table III, input values IN[8] and IN[9] (i.e., the lower inputs of multiplexers 204(0) and 204(1)) are output as first stage output values A[0] and A[1], respectively, to pre-multiplexers 210 and 212, and input values IN[2] to IN[7] are output as first stage output values A[2] to A[7], respectively, to pre-multiplexers 210 and 212. Further, input values IN[0] and IN[1] (i.e., the lower inputs of multiplexers 206(0) and 206(1)) are output as first stage output values A[8] and A[9], respectively, to pre-multiplexers 214 and 216, and input values IN[10] to IN[15] are output as first stage output values A[10] to A[15], respectively, to pre-multiplexers 214 and 216.

Referring to pre-multiplexers 210 to 216, as shown in the third column of Table III, first stage output values A[4] and A[5] (i.e., the lower inputs of multiplexers 210(0) and 210(1)) and first stage output values A[2] and A[3] (i.e., the upper inputs of multiplexers 210(2) and 210(3)) are output as second stage output values B[0] to B[3], respectively, to cyclic shifter 218. First stage output values A[0] and A[1] (i.e., the lower inputs of multiplexers 212(0) and 212(1)) and first stage output values A[6] and A[7] (i.e., the upper inputs of multiplexers 212(2) and 212(3)) are output as second stage output values B[4] to B[7], respectively, to cyclic shifter 220. First stage output values A[12] and A[13] (i.e., the lower inputs of multiplexers 214(0) and 214(1)) and first stage output values A[10] and A[11] (i.e., the upper inputs of multiplexers 214(2) and 214(3)) are output as second stage output values B[8] to B[11], respectively, to cyclic shifter 222. First stage output values A[8] and A[9] (i.e., the lower inputs of multiplexers 216(0) and 216(1)) and first stage output values A[14] and A[15] (i.e., the upper inputs of multiplexers 216(2) and 216(3)) are output as second stage output values B[12] to B[15], respectively, to cyclic shifter 224.

As shown in the fourth column of Table III, cyclic shifters 218 to 224 each cyclically downshift their respective second stage output values by two (where each cyclic downshift is equivalent to cyclically upshifting by two) to generate output values OUT[0] to OUT[15], which represent a cyclic downshift of 14 on input values IN[0] to IN[15] (which is equivalent to a cyclic upshift of two).

Returning to FIG. 1, first reconfigurable cyclic shifter 104 may be configured to operate in the same mode as second reconfigurable cyclic shifter 106 or in a mode different from second reconfigurable cyclic shifter 106. This flexibility in configuring first and second reconfigurable cyclic shifters 104 and 106 permits reconfigurable cyclic shifter arrangement 100 to be configured in nine different operating modes. FIG. 3 shows Table IV, which summarizes the nine different operating modes of reconfigurable cyclic shifter arrangement 100.

The nine different modes listed in Table IV of FIG. 3 may be used to implement a number of different cyclic shifting scenarios. FIG. 4 shows Table V, which summarizes five exemplary cyclic-shifting scenarios that may be implemented by reconfigurable cyclic shifter arrangement 100. These five exemplary cyclic-shifting scenarios are only a few of the many scenarios that may be implemented by cyclic shifter arrangement 100. The usefulness of these scenarios in relation to low-density parity-check (LDPC) decoding is discussed in further detail below in relation to FIG. 5.

In the first scenario, first reconfigurable cyclic shifter 104 and second reconfigurable cyclic shifter 106 of FIG. 1 are both configured in the third mode (i.e., as 16×16 cyclic shifters). First reconfigurable cyclic shifter 104 cyclically shifts 16 unshifted input values by a shift value S to generate 16 cyclically shifted output values OUT1[15:0], and second reconfigurable cyclic shifter 106 cyclically shifts the 16 cyclically shifted output values OUT1[15:0] by a shift value of N−S, where the number N of inputs to reconfigurable cyclic shifter arrangement 100 is equal 16 in this example. As a result, second reconfigurable cyclic shifter 106 generates 16 output values OUT2[15:0], which represent the 16 input values IN[15:0] in the order in which they were received (i.e., unshifted).

In the second scenario, first reconfigurable cyclic shifter 104 and second reconfigurable cyclic shifter 106 of FIG. 1 are both configured in the third mode. First reconfigurable cyclic shifter 104 receives 16 input values IN[15:0] that represent 16 original (i.e., unshifted) values that are shifted by an amount S, and cyclically shifts the values by an amount S'−S. As a result, first reconfigurable cyclic shifter 104 generates 16 output values OUT1[15:0], which represent the 16 original values cyclically shifted by S'. Second reconfigurable cyclic shifter 106 cyclically shifts the 16 cyclically shifted output values OUT1[15:0] by a shift value of N−S'. As a result, second reconfigurable cyclic shifter 106 generates 16 output values OUT2[15:0], which represent the 16 original, unshifted values.

In the third scenario, first reconfigurable cyclic shifter 104 of FIG. 1 is configured in the third mode, and second reconfigurable cyclic shifter 106 is configured in the first mode (i.e., as four 4×4 cyclic shifters). First reconfigurable cyclic shifter 104 receives 16 input values IN[15:0] that represent 16 original (i.e., unshifted) values that are shifted by an amount S (by, for example, a cyclic shifter located upstream of reconfigurable cyclic shifter arrangement 100 or reconfigurable cyclic shifter arrangement 100 itself during a previous iteration or sub-iteration), and cyclically shifts the values by an amount N−S. As a result, first reconfigurable cyclic shifter 104 generates 16 output values OUT1[15:0], which represent the 16 original, unshifted values. Second reconfigurable cyclic shifter 106 cyclically shifts the first four output values OUT1[3:0] by an amount S1, the second four output values OUT1[7:4] by an amount S2, the third four output values OUT1[11:8] by an amount S3, and the fourth four output values OUT1[15:12] by an amount S4. As a result, second reconfigurable cyclic shifter 106 generates four sets of four output values OUT2[3:0], OUT2[7:4], OUT2[11:8], and OUT2[15:12], which represent output values OUT1[3:0], OUT1[7:4], OUT1[11:8], and OUT1[15:12] cyclically shifted by amounts S1, S2, S3, and S4, respectively.

In the fourth scenario, reconfigurable cyclic shifters 104 and 106 of FIG. 1 are both configured in the first mode. First reconfigurable cyclic shifter 104 receives four sets of four input values IN[3:0], IN[7:4], IN[11:8], and IN[15:12], which represent four original (i.e., unshifted) sets of values that have been shifted (by, for example, a cyclic shifter located upstream of reconfigurable cyclic shifter arrangement 100 or reconfigurable cyclic shifter arrangement 100 itself during a previous iteration or sub-iteration) by amounts S1, S2, S3, and S4, respectively. First reconfigurable cyclic shifter 104 cyclically shifts the four sets by amounts N/4−S1, N/4−S2, N/4−S3, and N/4−S4. As a result, first reconfigurable cyclic shifter 104 generates four sets of four output values OUT1[3:0], OUT1[7:4], OUT1[11:8], and OUT1[15:12], which represent the four original, unshifted sets of four input values. Second reconfigurable cyclic shifter 106 cyclically shifts the first four unshifted output values OUT1[3:0] by an amount S1', the second four unshifted output values OUT1[7:4] by an amount S2', the third four unshifted output values OUT1[11:8] by an amount S3', and the fourth four unshifted output values OUT1[15:12] by an amount S4'. As a result, second reconfigurable cyclic shifter 106 generates four sets of four output values OUT2[3:0], OUT2[7:4], OUT2[11:8], and OUT2[15:12], which represent output values OUT1[3:0], OUT1[7:4], OUT1[11:8], and OUT1[15:12], respectively, cyclically shifted by amounts S1', S2', S3', and S4', respectively.

In the fifth scenario, first reconfigurable cyclic shifter 104 is of FIG. 1 configured in the first mode and second reconfigurable cyclic shifter 106 is configured in the third mode. First reconfigurable cyclic shifter 104 receives four sets of four input values IN[3:0], IN[7:4], IN[11:8], and IN[15:12], which represent four original (i.e., unshifted) sets of values that have been shifted (by, for example, a cyclic shifter located upstream of reconfigurable cyclic shifter arrangement 100 or reconfigurable cyclic shifter arrangement 100 itself during a previous iteration or sub-iteration) by amounts S1, S2, S3, and S4, respectively. First reconfigurable cyclic shifter 104 cyclically shifts the four sets by amounts N/4−S1, N/4−S2, N/4−S3, and N/4−S4. As a result, first reconfigurable cyclic shifter 104 generates four sets of four output values OUT1[3:0], OUT1[7:4], OUT1[11:8], and OUT1[15:12], which represent the four original, unshifted sets of four input values. Second reconfigurable cyclic shifter 106 cyclically shifts 16 output values OUT1[3:0], OUT1[7:4], OUT1[11:8], and OUT1[15:12] by a shift value S. As a result, second reconfigurable cyclic shifter 106 generates 16 output values OUT2[15:0], which represent the 16 original, values that have been shifted by S.

Although reconfigurable cyclic shifter arrangement 100 of FIG. A was described as comprising two 16×16 reconfigurable cyclic shifters, the present invention is not so limited. Reconfigurable cyclic shifter arrangements of the present invention may be implemented using reconfigurable cyclic shifters that are smaller than or greater than 16×16. For example, various embodiments of the present invention may be implemented using two 8×8 reconfigurable cyclic shifters or two 32×32 reconfigurable cyclic shifters.

Further, although reconfigurable cyclic shifter arrangement 100 was discussed as being implemented using reconfigurable cyclic shifters that are selectively operable in three different modes, the present invention is not so limited. Alternative reconfigurable cyclic shifter arrangements of the present invention may be implemented using reconfigurable cyclic shifters, wherein at least one reconfigurable cyclic shifter is selectively configurable in two or more different operating modes. For example, in embodiments that employ two 32×32 reconfigurable cyclic shifters, each 32×32 reconfigurable cyclic shifter may be implemented using eight 4×4 cyclic shifters and additional stages of pre-multiplexing to operate in four different operating modes (i.e., one 32×32 cyclic shifter, two 16×16 cyclic shifters, four 8×8 cyclic shifters, and eight 4×4 cyclic shifters).

As another example, rather than implementing first and second reconfigurable cyclic shifters 104 and 106 of FIG. 1 using four 4×4 cyclic shifters, first and second reconfigurable cyclic shifters 104 and 106 may be implemented using two 8×8 cyclic shifters that are configurable to operate in two different modes (i.e., one 16×16 cyclic shifter and two 8×8 cyclic shifters). In such embodiment, second pre-multiplexer stage 208 in FIG. 2(a) comprising multiplexers 210, 212, 214, and 216 may be eliminated such that the outputs of pre-multiplexer 204 are provided to one 8×8 cyclic shifter, and the outputs of pre-multiplexer 206 are provided to the other 8×8 cyclic shifter.

As yet another example, first and second reconfigurable cyclic shifters 104 and 106 may be implemented using two differently sized reconfigurable cyclic shifters (e.g., one 32×32 reconfigurable cyclic shifter and one 16×16 cyclic shifter). As even yet another example, first reconfigurable cyclic shifter 104 may be implemented to have a number of operating modes that is different from that of second reconfigurable cyclic shifter 106. For instance, first reconfigurable cyclic shifter 104 may be implemented using four 4×4 cyclic shifters to be selectively operable in three different modes as discussed above, and second reconfigurable cyclic shifter 106 may be implemented using two 8×8 cyclic shifters to be selectively operable in two different modes as discussed above.

Yet further, although reconfigurable cyclic shifter arrangement 100 was discussed as being implemented using two reconfigurable cyclic shifters connected in series, the present invention is not so limited. Reconfigurable cyclic shifter arrangements of the present invention may be implemented using more than two reconfigurable cyclic shifters connected in series. Further, reconfigurable cyclic shifter arrangements of the present invention may be implemented using one or more non-reconfigurable cyclic shifters in series with one or more reconfigurable cyclic shifters.

Figure 5:
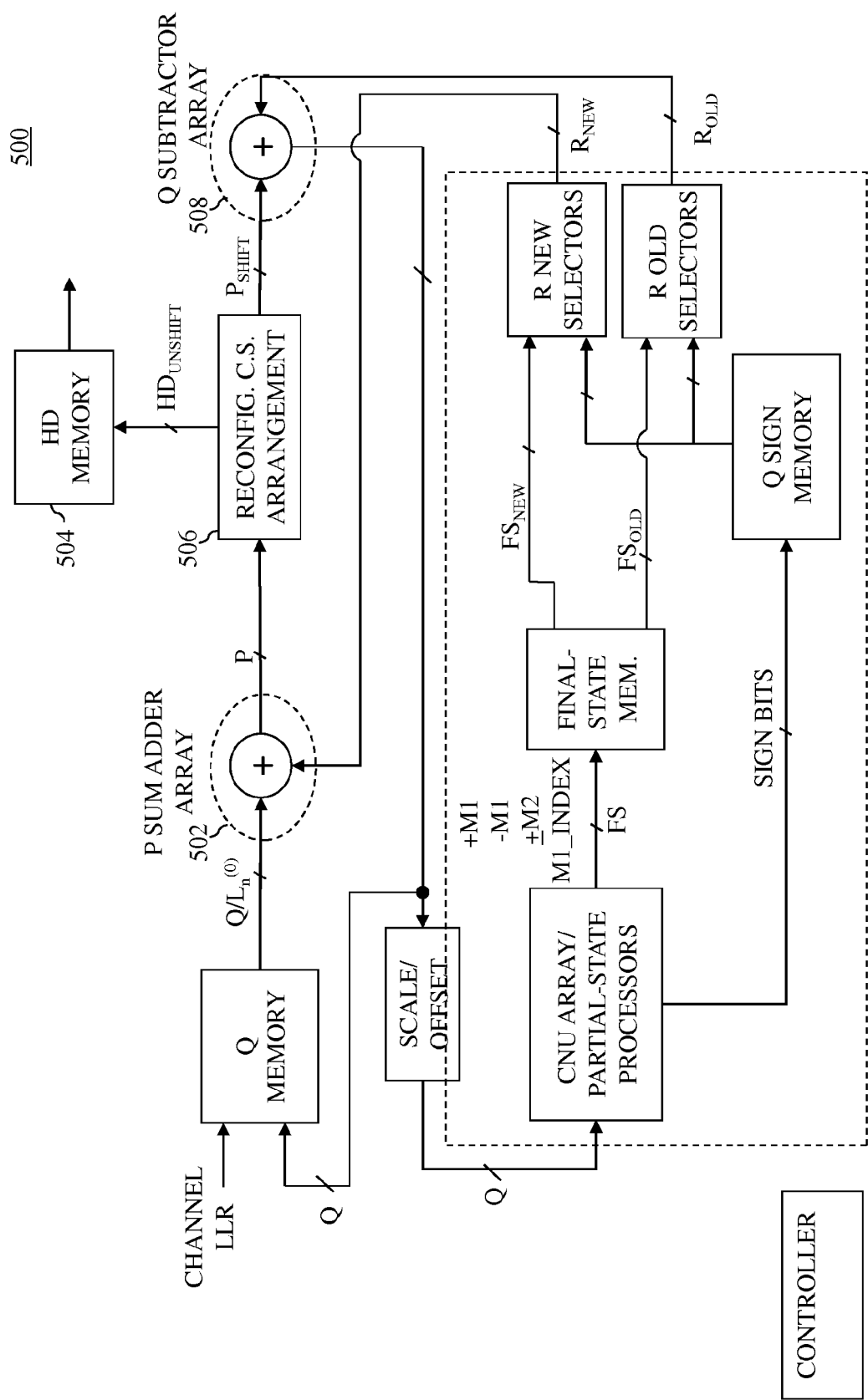
FIG. 5 shows a simplified block diagram of a layered low-density parity-check (LDPC) decoder according to one embodiment of the present invention.

FIG. 5 shows a simplified block diagram of a layered low-density parity-check (LDPC) decoder 500 according to one embodiment of the present invention. LDPC decoding is just one application in which reconfigurable cyclic shifter arrangements of the present invention may be used. Reconfigurable cyclic shifter arrangements of the present invention may also be used in other applications including, but not limited to, multi-processor interconnection networks and interleavers. LDPC decoder 500 operates in a manner similar to the LDPC decoder described in FIG. 12 of U.S. patent application Ser. No. 12/113,755 filed on May 1, 2008, the teachings of which are incorporated herein by reference in their entirety. However, rather than decoding codewords encoded based on an H-matrix having one circulant size, LDPC decoder 500 decodes codewords encoded based on an H-matrix having two or more different circulant sizes in a manner similar to that discussed in U.S. patent application Ser. No. 12/826,026 filed on Jun. 29, 2010, the teaching of which are incorporated herein by reference in their entirety.

To accommodate processing of two or more different circulant sizes, LDPC decoder 500 employs reconfigurable cyclic shifter arrangement 506, which may be implemented in a manner similar to that of reconfigurable cyclic shifter arrangement 100 of FIG. 1, albeit sized appropriately to process the two or more different circulant sizes. Reconfigurable cyclic shifter arrangement 506 receives P messages from P sum adder array 502 and cyclically shifts the P messages using any one of a number of different configurations of reconfigurable cyclic shifter arrangement 506.

For example, suppose that LDPC decoder 500 is used to decode codewords encoded using an H-matrix that has a first circulant size of 16×16 and a second circulant size of 4×4. When processing a layer of the H-matrix corresponding to the first circulant size, reconfigurable cyclic shifter arrangement 506 is configured such that the first and second reconfigurable cyclic shifters of reconfigurable cyclic shifter arrangement 506 are each configured as one 16×16 cyclic shifter (i.e., the first scenario discussed above in relation to FIG. 4). When switching between two layers, both corresponding to the first circulant size, reconfigurable cyclic shifter arrangement 506 receives shifted P values, and is configured such that the first and second reconfigurable cyclic shifters of reconfigurable cyclic shifter arrangement 506 are each configured as one 16×16 cyclic shifter (i.e., the second scenario discussed above in relation to FIG. 4). When switching from a layer corresponding to the first circulant size to a layer corresponding to the second circulant size, reconfigurable cyclic shifter arrangement 506 is configured such that the first reconfigurable cyclic shifter is configured as one 16×16 cyclic shifter, and the second reconfigurable cyclic shifter is configured as four 4×4 cyclic shifters (i.e., the third scenario discussed above in relation to FIG. 4).

When switching between two or more adjacent layers corresponding to the second circulant size, reconfigurable cyclic shifter arrangement 506 is configured such that the first and second reconfigurable cyclic shifters are each configured as four 4×4 cyclic shifters (i.e., the fourth scenario discussed above in relation to FIG. 4). When switching from a layer corresponding to the second circulant size to a layer corresponding to the first circulant size, reconfigurable cyclic shifter arrangement 506 is configured such that the first reconfigurable cyclic shifter is configured as a 4×4 cyclic shifter, and the second reconfigurable cyclic shifter is configured as one 16×16 cyclic shifter (i.e., the fifth scenario discussed above in relation to FIG. 4).

Upon processing input P messages (which are generated as described in U.S. patent application Ser. No. 12/113,755), one of the first and second outputs OUT1 and OUT2 of reconfigurable cyclic shifter arrangement 506 corresponds to P messages that have been shifted (i.e., $P_{SHIFT}$), and the other of the first and second outputs OUT1 and OUT2 correspond to unshifted P messages $P_{UNSHIFT}$ (i.e., P messages in the order of the columns of the H-matrix). Reconfigurable cyclic shifter arrangement 506 provides the output corresponding to the shifted P messages $P_{SHIFT}$ to Q subtractor array 508, and the hard-decisions (HD) bits of the output corresponding to the unshifted P messages $P_{UNSHIFT}$ to HD memory 504. Once all of the unshifted hard-decision bits have been stored for a given layer, HD memory 504 outputs the unshifted hard-decision bits to downstream processing (not shown), which may perform, for example, a convergence check to determine whether or not LDPC decoder 500 has converged on a valid codeword.

The present invention may be implemented as circuit-based processes, including possible implementation as a single integrated circuit (such as an ASIC, an FPGA, or digital signal processor), a multi-chip module, a single card, or a multi-card circuit pack. As would be apparent to one skilled in the art, various functions of circuit elements may also be implemented as processing blocks in a software program.

Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

The present invention can also be embodied in the form of a bitstream or other sequence of signal values stored in a non-transitory recording medium generated using a method and/or an apparatus of the present invention.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

We claim:

1. An apparatus comprising a reconfigurable cyclic shifter arrangement, the reconfigurable cyclic shifter arrangement comprising:

a first reconfigurable cyclic shifter adapted to cyclically shift N input values, N≥4, to generate a first set of N output values;

a second reconfigurable cyclic shifter adapted to cyclically shift the first set of N output values to generate a second set of N output values; and a controller adapted to selectively configure (i) the first reconfigurable cyclic shifter to operate in any one of at least first and second operating modes and (ii) the second reconfigurable cyclic shifter to operate in any one of the at least first and second operating modes, independent of the configuration of the first reconfigurable cyclic shifter, wherein:

a reconfigurable cyclic shifter configured in the first operating mode operates as a first set of cyclic shifters, the first set comprising one or more independent cyclic shifters, to independently cyclically shift one or more different subsets of N values; and a reconfigurable cyclic shifter configured in the second operating mode operates as a second set of cyclic shifters, the second set comprising two or more independent cyclic shifters, to independently cyclically shift two or more different subsets of N values, wherein the number of independent cyclic shifters in the second set is greater than the number of independent cyclic shifters in the first set.

2. The apparatus of claim 1, wherein:

in a first configuration of the reconfigurable cyclic shifter arrangement, the first and second reconfigurable cyclic shifters are both configured to operate in the first operating mode;

in a second configuration of the reconfigurable cyclic shifter arrangement, the first and second reconfigurable cyclic shifters are both configured to operate in the second operating mode;

in a third configuration of the reconfigurable cyclic shifter arrangement, the first reconfigurable cyclic shifter is configured to operate in the first mode and the second reconfigurable cyclic shifter is configured to operate in the second mode; and in a fourth configuration of the reconfigurable cyclic shifter arrangement, the first reconfigurable cyclic shifter is configured to operate in the second mode and the second reconfigurable cyclic shifter is configured to operate in the first mode.

3. The apparatus of claim 2, wherein the reconfigurable cyclic shifter arrangement is configured in either the third configuration or the fourth configuration.

4. The apparatus of claim 1, further comprising:

a first multiplexer adapted to selectively output one of the first and second sets of N output values to a first data path; and a second multiplexer adapted to selectively output a remaining one of the first and second sets of N output values to a second data path, different from the first data path.

5. The apparatus of claim 1, wherein each of the first and second reconfigurable cyclic shifters comprises:

at least one pre-multiplexer stage comprising a plurality of multiplexers; and at least two independent cyclic shifters, wherein:

the at least one pre-multiplexer stage is adapted to (i) receive N values and (ii) selectively output a different subset of the N values to each of the at least two independent cyclic shifters; and each of the at least two independent cyclic shifters is adapted to independently cyclically shift the corresponding different subset of the N values.

6. The apparatus of claim 5, wherein each of the multiplexers is a (2×1) multiplexer.

7. The apparatus of claim 5, wherein each of the first and second reconfigurable cyclic shifters comprises a plurality of pre-multiplexer stages.

8. The apparatus of claim 1, wherein the apparatus comprises a low-density parity-check (LDPC) decoder comprising the reconfigurable cyclic shifter arrangement.

9. The apparatus of claim 8, wherein the LDPC decoder is adapted to decode codewords encoded based on an H-matrix having two or more different circulant sizes.

10. The apparatus of claim 1, wherein:
the first set of N output values is shifted relative to the N input values; and
the second set of N output values is unshifted relative to the N input values.

11. The apparatus of claim 1, wherein the apparatus is an integrated circuit.

12. An apparatus comprising a reconfigurable cyclic shifter arrangement, the reconfigurable cyclic shifter arrangement comprising:
first shifting means for cyclically shifting N input values, N>≥4, to generate a first set of N output values;
second shifting means for cyclically shifting the first set of N output values to generate a second set of N output values; and
control means for selectively configuring (i) the first means to operate in any one of at least first and second operating modes and (ii) the second means to operate in any one of the at least first and second operating modes, independent of the configuration of the first means, wherein:
in the first operating mode, the shifting means operates as a first set of cyclic shifters, the first set comprising one or more independent cyclic shifters, to independently cyclically shift one or more different subsets of N values; and
in the second operating mode, the shifting means operates as a second set of cyclic shifters, the second set comprising two or more independent cyclic shifters, to independently cyclically shift two or more different subsets of N values, wherein the number of independent cyclic shifters in the second set is greater than the number of independent cyclic shifters in the first set.

13. A machine-implemented method, the method comprising:
cyclically shifting N input values, N≥4, using a first reconfigurable cyclic shifter to generate a first set of N output values;
cyclically shifting the first set of N output values using a second reconfigurable cyclic shifter to generate a second set of N output values; and
selectively configuring (i) the first reconfigurable cyclic shifter to operate in any one of at least first and second operating modes and (ii) the second reconfigurable cyclic shifter to operate in any one of the at least first and second operating modes, independent of the configuration of the first reconfigurable cyclic shifter, wherein:
a reconfigurable cyclic shifter configured in the first operating mode operates as a first set of cyclic shifters, the first set comprising one or more independent cyclic shifters, to independently cyclically shift one or more different subsets of N values; and
a reconfigurable cyclic shifter configured in the second operating mode operates as a second set of cyclic shifters, the second set comprising two or more independent cyclic shifters, to independently cyclically shift two or more different subsets of N values, wherein the number of independent cyclic shifters in the second set is greater than the number of independent cyclic shifters in the first set.

14. The method of claim 13, wherein:
in a first configuration, the first and second reconfigurable cyclic shifters are both configured to operate in the first operating mode;
in a second configuration, the first and second reconfigurable cyclic shifters are both configured to operate in the second operating mode;
in a third configuration, the first reconfigurable cyclic shifter is configured to operate in the first mode and the second reconfigurable cyclic shifter is configured to operate in the second mode; and
in a fourth configuration, the first reconfigurable cyclic shifter is configured to operate in the second mode and the second reconfigurable cyclic shifter is configured to operate in the first mode.

15. The method of claim 14, wherein the reconfigurable cyclic shifter arrangement is configured in either the third configuration or the fourth configuration.

16. The method of claim 13, further comprising:
selectively outputting one of the first and second sets of N output values to a first data path; and
selectively outputting a remaining one of the first and second sets of N output values to a second data path, different from the first data path.

17. The method of claim 13, wherein each of the first and second reconfigurable cyclic shifters comprises:
at least one pre-multiplexer stage comprising a plurality of multiplexers; and
at least two independent cyclic shifters, wherein:
the at least one pre-multiplexer stage is adapted to (i) receive N values and (ii) selectively output a different subset of the N values to each of the at least two independent cyclic shifters; and
each of the at least two independent cyclic shifters is adapted to independently cyclically shift the corresponding different subset of the N values.

18. The method of claim 13, wherein the method comprises performing low-density parity-check (LDPC) decoding of a codeword, wherein the cyclic shifting is a step performed in the LDPC decoding.

19. The method of claim 18, wherein the LDPC decoding comprises decoding codewords encoded based on an H-matrix having two or more different circulant sizes.

20. The method of claim 13, comprising:
shifting the first set of N output values relative to the N input values; and
shifting the second set of N output values relative to the N input values.

* * * * *